United States Patent
Choi et al.

(10) Patent No.: US 11,924,738 B1
(45) Date of Patent: Mar. 5, 2024

(54) MANAGING CONNECTIONS IN A MESH NETWORK HAVING MULTIPLE PROVISIONER DEVICES

(71) Applicant: Amazon Technologies, Inc., Seattle, WA (US)

(72) Inventors: Soon Hyeok Choi, Cupertino, CA (US); VenkatRaghavan VijayaRaghavan, Cupertino, CA (US); Bowei Feng, Newark, CA (US); Lakshmi Venkatraman, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 651 days.

(21) Appl. No.: 16/776,381

(22) Filed: Jan. 29, 2020

(51) Int. Cl.
| | |
|---|---|
| *H04L 12/26* | (2006.01) |
| *H04L 41/0823* | (2022.01) |
| *H04L 61/5069* | (2022.01) |
| *H04W 4/80* | (2018.01) |
| *H04W 8/00* | (2009.01) |
| *H04W 40/24* | (2009.01) |
| *H04W 76/11* | (2018.01) |
| *H04W 76/14* | (2018.01) |
| *H04W 76/15* | (2018.01) |
| *H04W 84/18* | (2009.01) |

(52) U.S. Cl.
CPC ....... *H04W 40/246* (2013.01); *H04L 41/0823* (2013.01); *H04L 61/5069* (2022.05); *H04W 4/80* (2018.02); *H04W 8/005* (2013.01); *H04W 76/11* (2018.02); *H04W 76/14* (2018.02); *H04W 76/15* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 7,649,899 B2 * | 1/2010 | Erwin | H04L 45/12 370/401 |
| 10,405,409 B2 * | 9/2019 | Kurihara | H04W 12/03 |
| 2005/0190704 A1 | 9/2005 | Zhang et al. | |
| 2012/0072423 A1 | 3/2012 | Morrison et al. | |
| 2017/0201854 A1 | 7/2017 | Choi et al. | |

(Continued)

OTHER PUBLICATIONS

U.S. Appl. No. 16/776,316, "Managing Connections in a Mesh Network," filed Jan. 29, 2020, 90 pages.

*Primary Examiner* — Zewdu A Beyen
(74) *Attorney, Agent, or Firm* — Kilpatrick Townsend & Stockton LLP

(57) ABSTRACT

Techniques for managing connections in a mesh network that includes multiple provisioners are described. In an example, a computer system receives, from a first device set up as a first provisioner in the mesh network, a first identifier of a third device of the mesh network. The computer system also receives, from a second device set up as a second provisioner in the mesh network, the first identifier of the third device. The computer system generates an association between the third device and the first device based at least in part on a determination that the third device is to be reached exclusively via the first device. The computer system also generates a message about an action to be performed by the third device and sends, based at least in part on the association, the message to the first device.

20 Claims, 22 Drawing Sheets

(56) References Cited

U.S. PATENT DOCUMENTS

| | | |
|---|---|---|
| 2018/0227218 A1* | 8/2018 | Thubert ................ H04L 45/128 |
| 2018/0302294 A1* | 10/2018 | Diancin ................ H04L 41/147 |
| 2018/0343200 A1 | 11/2018 | Jana et al. |
| 2019/0356573 A1 | 11/2019 | Chirikov et al. |
| 2020/0084689 A1* | 3/2020 | Arvidson .............. H04L 45/306 |
| 2020/0092203 A1 | 3/2020 | Di Marco et al. |
| 2020/0305062 A1 | 9/2020 | Kharvar et al. |
| 2020/0344667 A1 | 10/2020 | Zhang et al. |
| 2021/0153098 A1 | 5/2021 | Kuenzi |
| 2021/0168066 A1 | 6/2021 | Arvidson et al. |

* cited by examiner

MANAGING CONNECTIONS IN A MESH NETWORK HAVING MULTIPLE PROVISIONER DEVICES

CROSS REFERENCE TO RELATED APPLICATIONS

This application is related to and incorporates by reference for all purposes the full disclosure of co-pending U.S. patent application Ser. No. 16/776,316, filed Jan. 29, 2020, entitled "MANAGING CONNECTIONS IN A MESH NETWORK."

BACKGROUND

A Bluetooth mesh network is a computer network that allows many-to-many communications over Bluetooth radio. In particular, the Bluetooth mesh network includes a plurality of nodes, where each is capable of communicating over Bluetooth radio and is connected to at least one other node of the Bluetooth mesh network. The Bluetooth mesh network typically operates according to a flooding protocol, where an incoming packet on a link to a node is sent by the node on the remaining links to other nodes connected thereto.

Different types of nodes are possible to configure in the Bluetooth mesh network. For instance, a Bluetooth mesh network can include a plurality interconnected Internet of things (IoT) devices.

BRIEF DESCRIPTION OF THE DRAWINGS

Various embodiments in accordance with the present disclosure will be described with reference to the drawings, in which.

DETAILED DESCRIPTION

Figure 1:
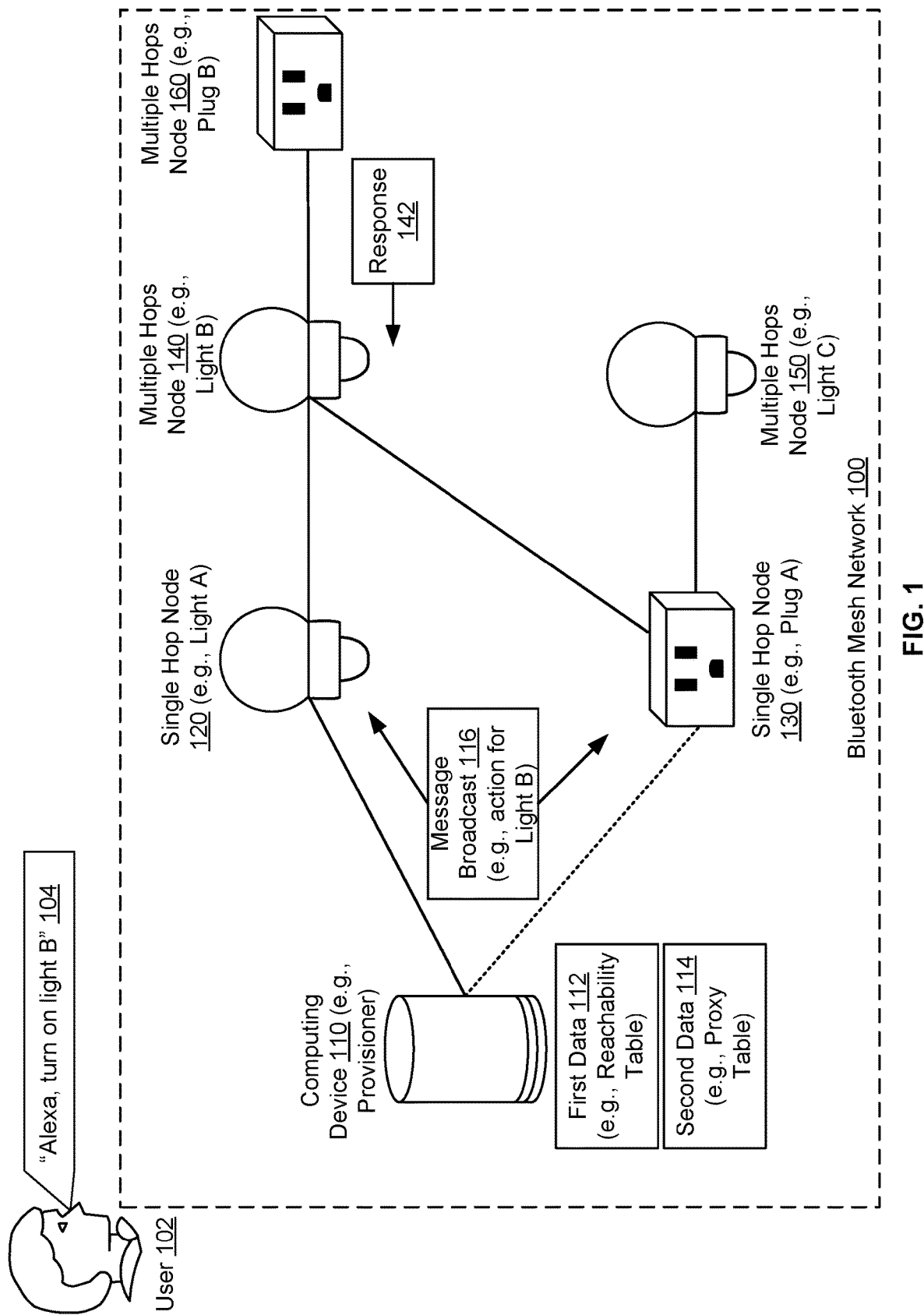
FIG. 1 illustrates an example of a Bluetooth mesh network, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to managing connections in a mesh network, such as a Bluetooth mesh network. In an example, the mesh network includes a provisioner and a plurality of mesh nodes. The provisioner, which is a computing device, and an un-provisioned computing device follow a fixed procedure, as defined in a mesh standard (e.g., in the Bluetooth mesh specification), where the provisioner provides the un-provisioned computing device with data that allows the un-provisioned device to join the mesh network and become a mesh node. The provisioner can be connected directly to a set of mesh nodes of the mesh network and indirectly to another set of mesh nodes of the mesh network. A direct connection is possible when the mesh node is within the radio range of the provisioner and can include a peer-to-peer connection. In this case, the mesh node is a single hop away from the provisioner in the mesh network. An indirect connection can be established with a mesh node via one or more intermediary mesh nodes. In this case, the mesh node is multiple hops away from the provisioner in the mesh network. As used herein, two devices being "communicatively coupled" with each other refers to the two devices being directly connected or indirectly connected.

The provisioner performs a network monitoring procedure to detect the set of mesh nodes that are a single hop away and the set of mesh nodes that are multiple hops away. The provisioner also performs a proxy node selection procedure to select a subset of the single hop away mesh nodes as proxy mesh nodes. A proxy mesh node is an intermediary mesh node that connects the provisioner to one or more multiple hops mesh nodes. Accordingly, the provisioner determines a mesh topology having a reduced number of proxy nodes and multiple hops mesh nodes connected thereto (e.g., the smallest possible number of proxy nodes such that all the mesh nodes in the mesh network can be reached, directly or indirectly as applicable, by the provisioner). Once the mesh topology is determined, the provisioner can broadcast a message about an action to be performed by a mesh node, establish a peer-to-peer connection with a proxy node associated with the mesh node, and receive the response of the mesh node over the peer-to-peer connection. Because the number of proxy nodes that the provisioner needs to connect to directly is reduced, improvements to using hardware resources of the provisioner for communicating with mesh nodes, including usage of its radio hardware to receive responses of such mesh nodes, become possible without impacting or with minimal impact to the network latency in the mesh network.

To illustrate, consider an example of a smart speaker, three smart light bulbs, and two smart plugs that form a Bluetooth mesh network. The smart speaker is set up as a provisioner of the Bluetooth mesh network and each of the smart light bulbs and smart plugs is provisioned by the smart speaker as a Bluetooth mesh node. Upon performing the network monitoring procedure, the smart speaker detects that each of a first smart light bulb and a first smart plug is one hop away, that a second smart light bulb and a second smart plug are multiple hops away and connected via the first smart plug, and that a third smart light bulb is multiple hops away via the first smart plug. The smart speaker also detects that the first smart plug is connected via the second smart light bulbs and, hence, is multiple hops away in this connection. Upon performing the proxy node selection procedure, the provisioner determines that the first smart light bulb can be set as a proxy node and the remaining IoT devices can be connected in multiple hops via the first smart light bulb. Although the first smart plug can be set up as a proxy node because it can be reached in a single hop, the proxy node selection procedure results in setting this IoT device as a multiple hops Bluetooth mesh node because doing so reduces the total number of proxy nodes while allowing all of the mesh networks to be connected with the smart speaker directly (e.g., as in the case of the first smart light bulb) or indirectly (e.g., as in the case of the remaining IoT devices). Because the total number of proxy nodes is reduced, the number of peer-to-peer connections that the smart speaker needs to establish for receiving responses of the IoT devices is reduced, thereby improving the usages of the smart speaker's radio. For instance, the provisioner can broadcast a message to turn on the smart bulb, establish a peer-to-peer connection with the first smart light bulb, such as a generic attribute profile (GATT), and receive a response of the third light bulb about its own status over the peer-to-peer connection. In this way, the provisioner need not establish a second peer-to-peer connection with the first smart light bulb (although this connection would have been a single hop connection), freeing up radio resources of the smart speakers to perform other tasks.

In an embodiment, a mesh network includes a plurality of provisioners, each connected to one or more mesh nodes, directly or indirectly. Some of the mesh nodes can be connected with multiple provisioners and, hence, are reachable via any of such provisioners. A computer system, such as one providing a cloud service for remotely controlling the provisioners and/or the mesh nodes, is connected with the provisioners over a data network, such as the Internet. Upon the network monitoring procedure being performed by a provisioner, the computer system receives from the provisioner data identifying the mesh nodes connected with the provisioner and the number of hops between the provisioner and each of such mesh nodes. Upon receiving such data from the different provisioners, the computer system performs a node assignment procedure. According to this procedure, the computer system detects, as applicable, the single hop node(s) and the multiple hop node(s) connected to each provisioner and generates associations between the provisioners and the mesh nodes to also reduce the number of connected single hop mesh nodes while ensuring that all mesh nodes remain connected. An association indicates an assignment of a mesh node exclusively to a provisioner. For instance, for a single hop mesh node that is connected to two provisioners, an assignment of the single hop mesh node to one of the provisioners indicates that this single hop mesh node is to be reached exclusively via the provisioner and is a proxy node, although the single hop mesh node could have been reached via the other provisioner. Upon receiving a request for an action by a mesh node, the computer system identifies a particular provisioner connected with the mesh node and sends a message about the action to the provisioner for forwarding to the mesh node. By reducing, the total number of single hop mesh nodes while ensure all mesh nodes remain connected, radio resource usages across the provisioners are also improved without a significant impact to the network latency.

To illustrate, consider the above Bluetooth example with the smart speakers, three smart light bulbs, and two smart plugs. In this example, a second smart speaker is set as a second provisioner in the Bluetooth mesh network and is connected with the first smart plug in a single hop and with a smart television in a single hop. Upon receiving the data from each of two smart speakers, the computer system determines that each of the first smart light and the first smart plug is a single hop away from the first smart speaker and that each of the first smart plug and the smart television is a single hop away from the second smart speaker. Upon performing the node assignment procedure, the computer system assigns the first smart light bulb as a single hop Bluetooth mesh node to the first smart speaker and the smart television as a single hop Bluetooth mesh to the second smart speaker. The computer system assigns each of the remaining IoT devices (e.g., the two smart plugs and the remaining two smart bulbs) as a multiple hops Bluetooth mesh node to the first smart speaker, where the multiple hops Bluetooth mesh node is reachable via the first smart light bulb. In this way, the computer system reduces the total number of single hop Bluetooth mesh node from three to two by assigning the first smart plug as a multiple hops Bluetooth mesh node to the first smart speaker while ensuring that all six of the IoT devices (e.g., the three smart light bulbs, the two smart plugs, and the smart television) remain connected in the Bluetooth mesh network.

Embodiments of the present disclosure provide various technical improvements. As explained herein above, the usage of hardware resources, including radio resources, can be improved without a significant impact to network latency. In particular, and within the context of a Bluetooth mesh network, the Bluetooth standard for mesh networking generally allows two types of connection: broadcast and peer-to-peer. In many situations, the radio of the provisioner can be shared between multiple communication standards, including Bluetooth and WiFi. If broadcast connections are used for transmission and reception, the radio is practically used a significant portion of the time (if not completely) for Bluetooth communications and, hence, hinders the use of the radio for WiFi and/or other communication protocols and results in packet drops of the WiFi and/or other communication protocols. If peer-to-peer connections are used for transmission and reception, the network latency can be increased significantly because of the need to establish and terminate multiple peer-to-peer connections. By using the network monitoring procedure and the proxy node selection of the embodiments of the present disclosure, a hybrid approach becomes possible. In particular, broadcast can be used for transmission and a peer-to-peer connection can be selectively used for reception, thereby reducing the radio resource usage without a significant impact to the network latency.

In the interest of clarity of explanation, various embodiments of the present disclosure are described in connection with a Bluetooth mesh network. However, the embodiments are not limited as such. Instead, the embodiments similarly apply to any type of mesh network that includes one or more provisioners and one or more mesh nodes.

In the present disclosure, a "device" refers to a computing device that can support functionalities of a mesh network, such as a Bluetooth mesh network. A device can be a "computing device" that is usable as a provisioner of the mesh network. In this case, the device is referred to as a "provisioner" in the interest of clarity of explanation. A device can also be a "computing device" that is provisioned by the provisioner as a node of the mesh network. In this case, the device is referred to as a "mesh node" (or, a "Bluetooth mesh node" when the mesh network is a Bluetooth mesh network) in the interest of clarity of explanation. A mesh node can be a single hop away from the provisioner and can be set up as a proxy node by the provisioner. In this case, the mesh node is referred to as a "single hop mesh node" in the interest of clarity of explanation. A mesh node can also be multiple hops away from the provisioner and can be connected with the provisioner via a proxy node. In this case, the mesh node is referred to as a "multiple hops mesh node" in the interest of clarity of explanation. Accordingly, a provisioner, a mesh node, a proxy node, a single hop mesh node, and a multiple hops mesh node are examples of devices that can be connected in a mesh network.

FIG. 1 illustrates an example of a Bluetooth mesh network 100, according to embodiments of the present disclosure. As illustrated, the Bluetooth mesh network 100 includes a plurality of IoT devices interconnected as Bluetooth mesh nodes over Bluetooth radio according to a Bluetooth standard, such as the Bluetooth mesh specification developed by the Bluetooth Special Interest Group (Bluetooth SIG). The IoT devices include a computing device 110, illustrated as a smart speaker, which is a Bluetooth mesh node set as a provisioner in the Bluetooth mesh network 100. The IoT devices also include a single hop Bluetooth mesh node 120, illustrated as a smart light bulb A, and a single hop Bluetooth mesh node 130, illustrated a smart plug A. Each of the single hop Bluetooth mesh node 120 and 130 are a single hop away from the computing device 110 because they are within the Bluetooth radio range of the computing device 110 and can be reached by the computing device 110 by setting up a peer-to-peer connection therewith (e.g., a GATT connection). Further, the IoT devices include a multiple hops Bluetooth mesh node 140, illustrated as a smart light bulb B, a multiple hops Bluetooth mesh node 150, illustrated as a smart light bulb C, and a multiple hops Bluetooth mesh node 160, illustrated as a smart plug B. Each of the multiple hops Bluetooth mesh nodes 140-160 are multiple hops away from the computing device 110 and can be reached via one or more intermediary mesh nodes. Of course, the Bluetooth mesh network 100 can have a different network topology and/or can include a different type and/or number of computing devices, such as smart appliances, smart televisions, smart sensors, mobile devices, and the like that connect over the Bluetooth radio according to the Bluetooth standard. A request 104 of a user 102 for action to be performed by a particular IoT device of the Bluetooth mesh network 100, illustrated as a natural language utterance of "Alexa, turn on light B," is received and processed. A message is derived from the request 102 and sent in the Bluetooth mesh network 100 for the action to be performed by the particular IoT device.

Each of the Bluetooth mesh nodes 110-160 represents a computing device that includes a suitable set of radio hardware, a suitable memory(ies) storing computer-readable instructions and a suitable processor(s) for executing the computer-readable instructions. The radio hardware supports the Bluetooth standard and, optionally, other communications standard, such as WiFi. The computer-readable instructions represents program code of one or more applications, including an application for supporting the Bluetooth standard.

In an example, the request 104 is received as a natural language utterance data by the computing device 110 and includes a wakeword (e.g., Alexa). Upon detecting the wakeword, the computing device 110 can locally and/or remotely via a computer system (e.g., such as the computer system 280 illustrated in FIG. 2) determine an action to be performed by the particular IoT device and generate a message 116 that includes data about the action and a Bluetooth mesh address of the IoT device as a destination address. The message 116 is broadcasted over Bluetooth broadcast connections to various Bluetooth mesh nodes of the Bluetooth mesh network 100, including the two single hop Bluetooth mesh nodes 120 and 130 that are within the Bluetooth range of the computing device 100. This message 116 is relayed forward by the single hop Bluetooth mesh nodes 120 and 130 to the multiple hops Bluetooth mesh nodes 140-160. Upon receiving the message 116, the multiple hops Bluetooth mesh node 140 determines that the destination address in the message 116 matches its Bluetooth mesh address and, accordingly, further processes the data from the message 116, performs the action (e.g., turns the light on), and sends a response 142 to the message 116 (e.g., a Bluetooth packet acknowledging that the message 116 was received).

Rather than waiting to receive the response 142 on one of the broadcast Bluetooth broadcast connections, the computing device 110 sets up a peer-to-peer connection, such as a GATT connection with one of the single hop Bluetooth mesh nodes 120 and 130 and receives the response 142 as one or more packets over the peer-to-peer connection. In particular, the computing device 110 selects the single hop mesh node 120 instead of the single hop Bluetooth mesh node 130 for the peer-to-peer connection, where this selection is based on first data 112 and second data 114. As illustrated with the solid line and the dotted line in FIG. 1, the peer-to-peer connection is established with the single hop node 120 (illustrated with the solid line) and not with the single hop Bluetooth mesh node 130 (the lack of the peer-to-peer connection although possible to establish it is illustrated with the dotted line). The computing device 110 receives the response 142 over the established peer-to-peer connection and, thereafter, terminates the peer-to-peer connection.

The first data 112 indicates that the various Bluetooth mesh network nodes 120-160 are reachable by the computing device directly or indirectly. In other words, the reachability data can indicate a topology of the Bluetooth mesh network 100, where each of Bluetooth mesh nodes 120 and 130 are a single hop away from the computing device 110 and can be set as proxy nodes, and where each of the remaining Bluetooth mesh nodes are multiple hops way from the computing device and cannot be set as proxy nodes. In comparison, the second data 114 indicates that the single hop Bluetooth mesh node 120, and not the single hop Bluetooth mesh node 130, is to be set by the computing device 110 as a proxy node and that the remaining Bluetooth mesh nodes 130-160 are to be reached by the computing device 110 via the single hop Bluetooth mesh node 120 and, thus, are to be set as multiple hops Bluetooth mesh nodes (e.g., although the Bluetooth mesh node 130 can be connected in a single hop, this connection is not to be established and instead the Bluetooth mesh node 130 is to be connected in a multiple hops connection via the single Bluetooth mesh node 120).

In an example, the first data 112 indicates reachability by the computing device 110 to each of the Bluetooth mesh nodes of the Bluetooth mesh network 100. In other words, the first data 112 includes reachability data indicating a first set of Bluetooth mesh nodes each being a single hop away from the computing device 110 and a second set of Bluetooth mesh nodes each being multiple hops away from the computing device 110. For instance, the reachability data is stored in memory of the computing device 110 as a data structure, such as a first table. An entry in the data structure associates the Bluetooth mesh address of a single hop Bluetooth mesh node and, as applicable, with the Bluetooth mesh address(es) of the multiple hops Bluetooth mesh address(es) that can be reached by the computing device 110 via the single hop Bluetooth mesh node and the number of hops to the computing device 110. In the particular illustration of FIG. 1, a first entry in the data structure associates the Bluetooth mesh address of the single hop Bluetooth mesh node 120 with the Bluetooth mesh address of the multiple hops Bluetooth mesh node 140 and a hop count of two, with the Bluetooth mesh address of the multiple hops Bluetooth mesh node 150 and a hop count of four, with the Bluetooth mesh address of the multiple hops Bluetooth mesh node 160 and a hop count of three, and with the Bluetooth mesh node 130 with a hop count of three. Similarly, a second entry in the data structure associates the Bluetooth mesh address of the multiple hops Bluetooth mesh node 130 with the Bluetooth mesh address of the multiple hops Bluetooth mesh node 140 and a hop count of two, with the Bluetooth mesh address of the multiple hops Bluetooth mesh node 150 and a hop count of two, with the Bluetooth mesh address of the multiple hops node 160 and a hop count of three, and with the Bluetooth mesh node 120 with a hop count of three. Examples of the data structure for storing the first data 112 and of network monitoring procedures for generating the first data 112 are further described in connection with the next figures.

In an example, the second data 114 indicates a subset of the first set of the single hop Bluetooth mesh nodes that are to be used as proxy nodes, so that multiple hop Bluetooth nodes are to be reached via one or more of such proxy nodes. In other words, the second data 114 includes proxy data indicating which of the single hop Bluetooth mesh node 120 and 130 is to be set as a proxy node. The proxy data can be stored as a data structure, such as a second table, in the memory of the computing device 110. In the particular illustration of FIG. 1, an entry in the data structure associates the Bluetooth mesh address of the single hop Bluetooth mesh node 120 with the Bluetooth mesh address of the multiple hops Bluetooth mesh node 140, with the Bluetooth mesh address of the multiple hops Bluetooth mesh node 150, with the Bluetooth mesh address of the multiple hops Bluetooth mesh node 160, and with the Bluetooth mesh address of the Bluetooth mesh node 130, thereby indicating that the single hop Bluetooth mesh node 120 is a proxy node and that the Bluetooth mesh nodes 130-160 are to be reached by the computing device 110 via the single hop Bluetooth mesh node 120. The second data 114 can be generated from the first data 112 according to a node selection procedure that reduces or minimizes the total number of proxy nodes. Examples of the data structure for storing the second data 114 and of the node selection procedure for generating the second data 114 are further described in connection with the next figures. Although FIG. 1 describes a reduction to a single proxy node connected to the computing device 110, the reductions can be to one or more proxy nodes depending on the configuration of the Bluetooth mesh network 100.

Accordingly, based on the first data 112, the computing device 110 determines that each of the single hop Bluetooth mesh node 120 and 130 can be set as a potential proxy node and, based on the second data 114, determines that only the single hop Bluetooth mesh node 120 is to be set as a proxy node. The single hop Bluetooth mesh node 120 is set as the proxy node by establishing the peer-to-peer connection therewith such that any of the Bluetooth mesh nodes 130-160 are to be reached by the computing device via this proxy node (e.g., to receive any response from such Bluetooth mesh nodes).

Although FIG. 1 illustrates the request 104 as a natural language utterance data, other user inputs are possible and depends on, for instance, the input modality that the computing device 110 supports. In particular, if the computing device 110 supports a graphical user interface (GUI), the request can be received as user input data at the GUI. In another illustration, the user input can be received as request data from another computing device over a different communication standard, such as from a smartphone that is connected with the computing device 110 over WiFi via an access point or directly.

Figure 2:
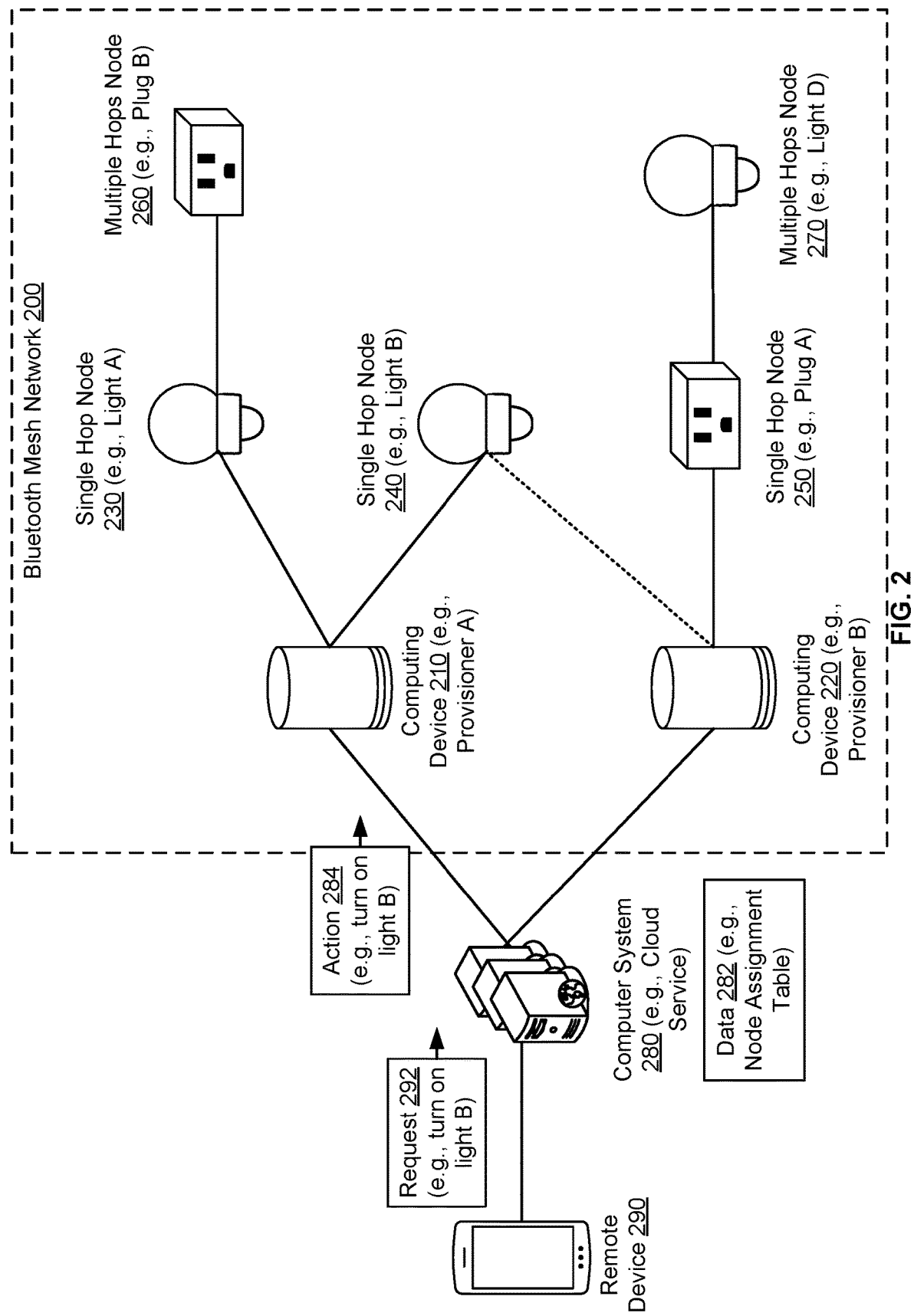
FIG. 2 illustrates an example of a Bluetooth mesh network that includes a plurality of provisioners, according to embodiments of the present disclosure.

FIG. 2 illustrates an example of a Bluetooth mesh network 200 that includes a plurality of provisioners, according to embodiments of the present disclosure. As illustrated, the Bluetooth mesh network 100 includes a plurality of IoT devices interconnected as Bluetooth mesh nodes over Bluetooth radio according to a Bluetooth standard, such as the Bluetooth mesh specification developed by the Bluetooth SIG. The IoT devices include a first computing device 210, illustrated as a first smart speaker, which is a Bluetooth mesh node set as a first provisioner in the Bluetooth mesh network 200. The IoT devices also include a second computing device 220, illustrated as a second smart speaker, which is a Bluetooth mesh node set as a second provisioner in the Bluetooth mesh network 200. Further, the IoT devices include a single hop Bluetooth mesh node 230, illustrated as a smart light bulb A, and a single hop Bluetooth mesh node 240, illustrated as a smart light bulb B. Each of the single hop Bluetooth mesh node 230 and 240 are a single hop away from the first computing device 210 because they are within the Bluetooth radio range of the first computing device 210 and can be reached by the first computing device 210 by setting up a peer-to-peer connection therewith (e.g., a GATT connection). In addition, the IoT devices include a single hop Bluetooth mesh node 250, illustrated as a smart plug A, that is a single hop away from the second computing device 220 because it is within the Bluetooth radio range of the second computing device 220 and can be reached by the second computing device 220 by setting up a peer-to-peer connection therewith (e.g., a GATT connection). Further, the IoT devices include a multiple hops Bluetooth mesh node 260, illustrated as a smart plug B, connected with the single hop Bluetooth mesh node 230, and a multiple hops Bluetooth mesh node 270, illustrated as a smart light bulb D, connected with the single hop Bluetooth mesh node 250. Each of the multiple hops Bluetooth mesh nodes 260-270 are multiple hops away from the computing devices 210 and 220 and can be reached via one or more intermediary mesh nodes. Of course, the Bluetooth mesh network 200 can have a different network topology and/or can include a different type and/or number of computing devices.

The IoT devices of the Bluetooth mesh network 200 can be registered under a user account managed at a computer system 280. The computer system 280 can provide various computing services including, for instance, remote controls and remote access to the IoT devices, natural language processing to support remote controls and remote access, and other server-based services (e.g., a cloud service). The computer system 280 can be connected over one or more data networks other than the Bluetooth mesh network 200, such as via the Internet, with the first computing device 210, the second computing device 220, and/or other provisioners of the Bluetooth mesh network 200.

A remote computing device 290 can also be connected with the computer system 280 over one or more data networks, including the Internet. The remote device 290 can be registered under the user account and/or can execute an application that is logged in to the user account. Upon a user input via a user interface of the remote computing device 290 for an action 284 to be performed by an IoT device of the Bluetooth mesh network 200 (e.g., to turn on the smart light bulb B), the remote computing device 290 sends a request 292 to the computer system 280. The computer system identifies a destination of the request 292 (e.g., the single hop Bluetooth mesh node 240 corresponding to the smart light bulb B) and, based on data about the topology of the Bluetooth mesh network 200, selects a particular one of the provisioners (e.g., the first computing device 210) and sends data to the selected provisioner over the one or more data networks, where this data identifies the action 284 and the destination (e.g., the Bluetooth mesh address or another other identifier of the single hop Bluetooth mesh node 240). Upon receiving the data, the selected provisioner derives and sends a Bluetooth message and waits for a Bluetooth response of the single hop Bluetooth mesh node 240. The transmission of the Bluetooth message and the reception of the Bluetooth response can be performed based on reachability data and proxy data as described in connection with FIG. 1.

In an example, the data 282 is generated by the computer system 280 upon receiving reachability data of the first computing device 210, the second computing device 220, and, as applicable, any other provisioner of the Bluetooth mesh network 200. The data 282 indicates, for each of the provisioners, the Bluetooth mesh nodes 200 that are to be reached via the provisioner. The computer system 280 generates the data by performing a node assignment procedure that, given the reachability data, reduces or minimizes the number of single hop Bluetooth mesh nodes that are to be set as proxy nodes, while ensuring that all the Bluetooth mesh nodes remain connected (e.g., are reachable via the proxy nodes). In this way, the provisioners of the Bluetooth mesh network 200 (e.g., the computing devices 210 and 220) need not share proxy nodes, thereby resolving or avoiding contention over usage of the proxy nodes. In other words, the data 282 includes node assignment data including, for each provisioner, an association of the provisioner with one or more Bluetooth mesh nodes, if any, where an association indicates that such Bluetooth mesh node(s) are assigned to the provisioner and are reachable by the computer system 280 exclusively via the provisioner. Hence, if a Bluetooth mesh node is reachable via two or more provisioners (e.g., the single hop Bluetooth mesh node 240), the node assignment data indicates that this Bluetooth mesh node is to be reached exclusively via one of the two or more provisioners (e.g., via the first computing device 210, as illustrated with the solid line, and not the second computing device 220 although reachable otherwise via this second computing device 220, as illustrated with the dotted line).

The node assignment data can be stored as a data structure, such as a node assignment table, in memory of the computer system 280 and, portions thereof or its entirety can be sent to and stored in memory of each of the provisioners. In the particular illustration of FIG. 2, a first entry in the data structure associates the Bluetooth mesh address of the first computing device 210 with the Bluetooth mesh address of the single hop node 230, with the Bluetooth mesh address of the single hop Bluetooth mesh node 240, and with the Bluetooth mesh address of the multiple hops Bluetooth mesh node 260. Similarly, a second entry in the data structure associates the Bluetooth mesh address of the second computing device 220 with the Bluetooth mesh address of the single hop node 250 and with the Bluetooth mesh address of the multiple hops Bluetooth mesh node 270. Examples of the data structure for storing the data 282 and of node assignment procedures for generating the data 282 are further described in connection with the next figures.

Accordingly, upon receiving the request 292 and determining that the action 284 is applicable to the single hop Bluetooth mesh node 240, the computer system 280 determines that the data about the action 284 is to be sent to the first computing device 210 and not the second computing device 220 based on the data 282. The computer system 280 sends the data about the action 284 to the first computing device 210 that, then sends the relevant Bluetooth message (e.g., turn on smart light bulb B) and receives the relevant Bluetooth response from the single hop Bluetooth mesh node 240 (e.g., one or more packets acknowledging the receipt of the Bluetooth message).

Figure 3:
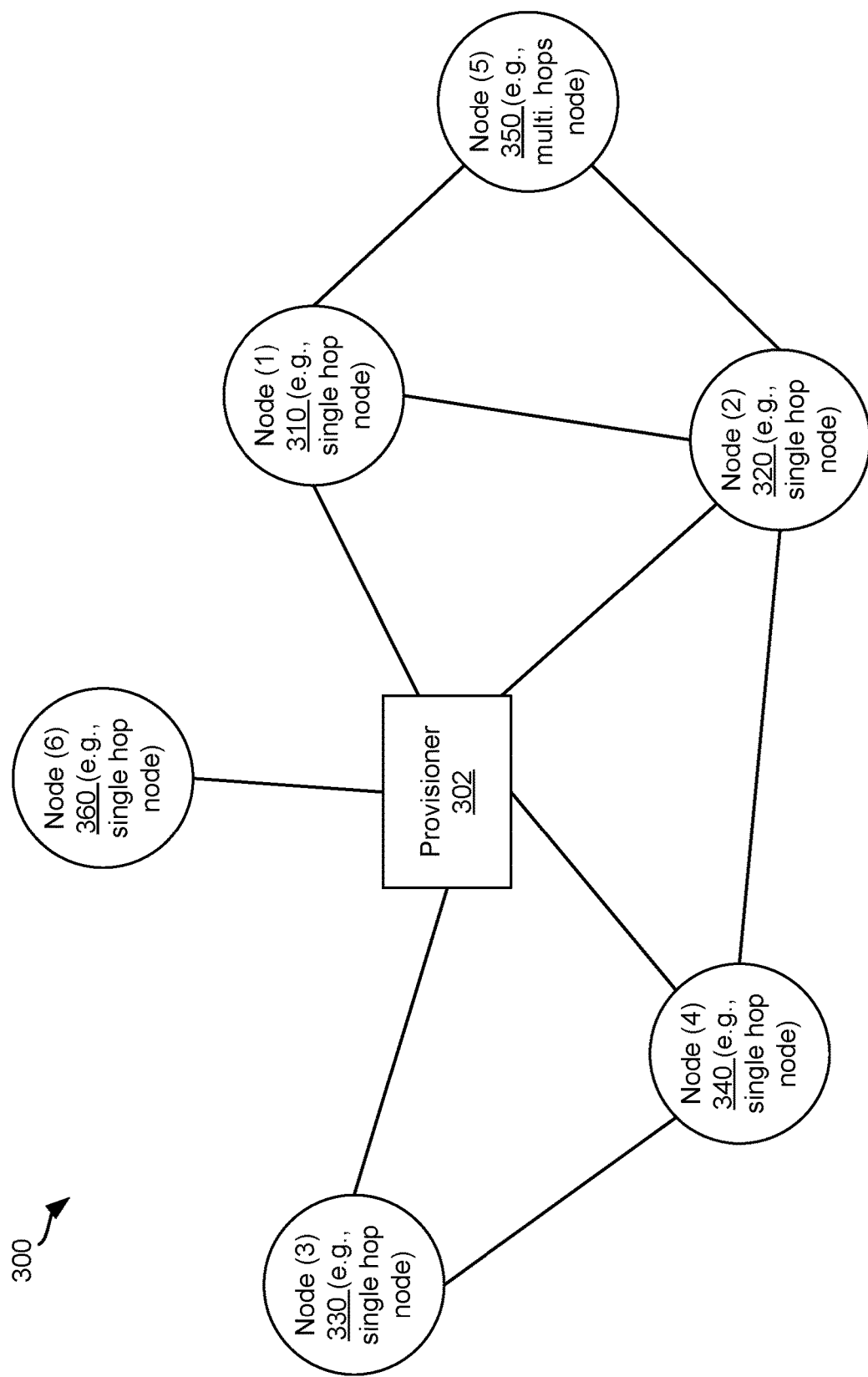
FIG. 3 illustrates an example of a Bluetooth mesh network that includes a provisioner and multiple Bluetooth mesh nodes, according to embodiments of the present disclosure.

FIG. 3 illustrates an example of a Bluetooth mesh network 300 that includes a provisioner 302 and multiple Bluetooth mesh nodes 320-360, according to embodiments of the present disclosure. The Bluetooth mesh network 300 is an example of the Bluetooth mesh network 100 of FIG. 1. The provisioner 302 is a computing device of the Bluetooth mesh network 300 that provisioned the various Bluetooth mesh nodes 310-360. The provisioning includes assigning Bluetooth mesh addresses to the Bluetooth mesh nodes, each illustrated as a numeral between parentheses in FIG. 1 (e.g., Bluetooth mesh address "1" for Bluetooth mesh node 310). Thus, at the time of provisioning, the Bluetooth mesh addresses are known to the provisioner 302.

The topology of the Bluetooth mesh network 300 is provided for illustrative purposes only. Other topologies are possible. As illustrated, an edge between a first Bluetooth mesh node and a second Bluetooth mesh node (including the provisioner 302 that is a Bluetooth mesh node) indicates that the first Bluetooth mesh node can directly send and receive Bluetooth mesh messages with the second Bluetooth mesh node. In other words, the edge represent that the second Bluetooth mesh node is reachable by the first Bluetooth mesh node (and vice versa) in a single hop (e.g., these two Bluetooth mesh nodes are communicatively coupled with each in a direct connection).

Relative to the provisioner 302, each of the Bluetooth mesh node 310, Bluetooth mesh node 320, Bluetooth mesh node 330, Bluetooth mesh node 340, and Bluetooth mesh node 360 is a single hop away. In comparison, the Bluetooth mesh node 350 is two hops away from the provisioner 302 and can be reached by the provisioner 302 via the Bluetooth mesh node 310 (e.g., the Bluetooth mesh node 350 is communicatively coupled with the provisioner in an indirect connection). Similarly, the Bluetooth mesh node 350 is at least two hops away from the Bluetooth mesh node 340 and can be reached in two hops by the Bluetooth mesh node 340 via the Bluetooth mesh node 320.

As illustrated in FIG. 3, the provisioner 302 and the various Bluetooth mesh nodes 320-360 are communicatively coupled with each other in direct and indirect connections, resulting in different network paths between the provisioner 302 and each of the Bluetooth mesh nodes 320-360. A network path can correspond to a direct connection, in which case, this network path includes the provisioner 302 and a single hop away Bluetooth mesh node. A network path can correspond to an indirect connection, in which case, this network path includes the provisioner 302, a single hop away Bluetooth mesh node, and at least one multiple hops away Bluetooth mesh node communicatively coupled with the single hop away Bluetooth mesh node. Unless indicated otherwise, a connection or being connected can refer to either a direct connection or an indirect connection. In the example illustration of FIG. 3, a first network path between the provisioner 302 and the Bluetooth mesh node 320 is a direct connection that includes only the provisioner 302 and the Bluetooth mesh node 320. In this first network path, the Bluetooth mesh node 320 is reachable by the provisioner 302 in a single hop. A second network path between the provisioner 302 and the Bluetooth mesh node 320 is an indirect connection that includes a direct connection between the provisioner 302 and the Bluetooth mesh node 310 and a direct connection between the Bluetooth mesh node 310 and the Bluetooth mesh node 320. In this first network path, the Bluetooth mesh node 320 is reachable by the provisioner 302 via the Bluetooth mesh node 310 in two hops. In both network paths, the Bluetooth mesh node 320 is connected to the provisioner 302, but this communicative coupling is direct and consists of a single hop in the first network path and is indirect and consists of two hops in the second network path.

Figure 4:
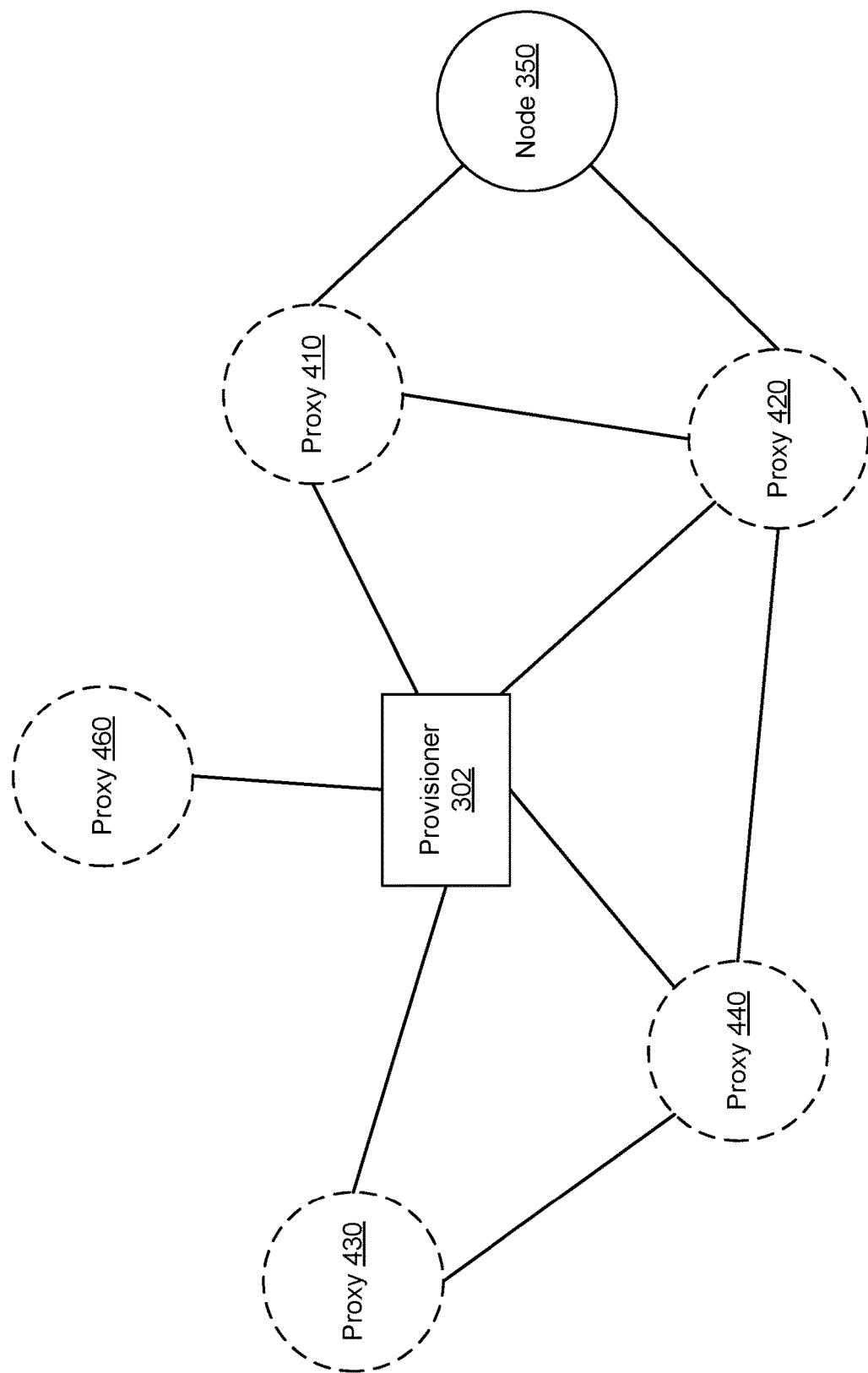
FIG. 4 illustrates an example of potential proxy nodes in the Bluetooth mesh network of FIG. 3, according to embodiments of the present disclosure.

FIG. 4 illustrates an example of potential proxy nodes in the Bluetooth mesh network 300 of FIG. 3, according to embodiments of the present disclosure. As explained herein above, the Bluetooth mesh address of the Bluetooth mesh nodes 310-360 are known to the provisioner 302. Additionally, the provisioner 302 maintains the hop count information (e.g., the number of hops) of all the Bluetooth mesh nodes 310-360. This information allows the provisioner 302 to determine which of the Bluetooth mesh nodes 310-360 are a single hop away. The single hop Bluetooth mesh nodes can be potentially set as proxy nodes. In the illustrative example of FIG. 4, each of the Bluetooth mesh node 310, Bluetooth mesh node 320, Bluetooth mesh node 330, Bluetooth mesh node 340, and Bluetooth mesh node 360 is a single hop away and, thus, can potentially be set as a proxy node. FIG. 4 illustrates this potential by showing these Bluetooth mesh nodes 310-340 and 360 with a dashed line and labeling them as proxy node 410, proxy node 420, proxy node 430, proxy node 440, and proxy node 450.

In certain situations, the provisioner 302 maintains up-to-date hop count information. For instance, based on a trigger event for a network monitoring procedure, the provisioner 302 can identify the single hop Bluetooth mesh based on a Bluetooth radio scan and, as further illustrated in the next figures, can determine the multiple hops Bluetooth mesh nodes by setting proxy nodes.

In an example, a Bluetooth mesh node has a Bluetooth device address and a Bluetooth mesh address. The Bluetooth device address can be set by the Bluetooth mesh node itself and can randomly change at random times. In comparison, the Bluetooth mesh address is set by the provisioner 302, less frequently changes, and the change is known to the provisioner 302.

To determine the Bluetooth mesh addresses of the single hop Bluetooth mesh nodes 310-340 and 360, the provisioners performs a scan of all the mesh nodes that are within its Bluetooth radio range just upon the occurrence of the trigger event and before the start of network monitoring procedure. When a Bluetooth mesh node supports the proxy feature but when this Bluetooth mesh node is not connected to any node as proxy, the Bluetooth mesh node periodically announce its presence by sending a periodic proxy beacon. The proxy beacon contains the Bluetooth device address. The provisioner 302 listens to the channel to receive the proxy beacon and determines the Bluetooth device address. However, at this point and if the Bluetooth device address had changed since the last scan, the provisioner 302 does not know the correspondence to an assigned. Bluetooth mesh address. To do so, the provisioner 302 requests the Bluetooth mesh address from the Bluetooth mesh node by sending a Bluetooth mesh control message thereto. Upon receiving the Bluetooth mesh address in a response from the Bluetooth mesh, the provisioner 302 now has this node's Bluetooth device address and Bluetooth mesh address and thus can map the two addresses to each other.

Various triggers events are possible. For instance, the trigger event can include any of a periodic update, a booting of the provisioner 302, an addition of Bluetooth mesh node to the Bluetooth mesh network 300, a removal of a Bluetooth mesh node from the Bluetooth mesh network 300, a loss of connection of a Bluetooth mesh node the Bluetooth mesh network 300, or a request from a remote computer system (e.g., the computer system 280 of FIG. 2). The periodic update can be configurable to a particular time interval, such as one minute, two minutes, or some other time interval. The booting of the provisioner 302 can occur for various reasons, including a re-powering of the provisioner 302 from a power source. The request from the computer system can be received over a data network and can occur for various reasons including, for instance, a periodic request, a detection by the computer system of an addition, removal, or loss of connection of another provisioner, and the detection of any change to the Bluetooth mesh network 300 based on changes to a corresponding user account.

Figure 5:
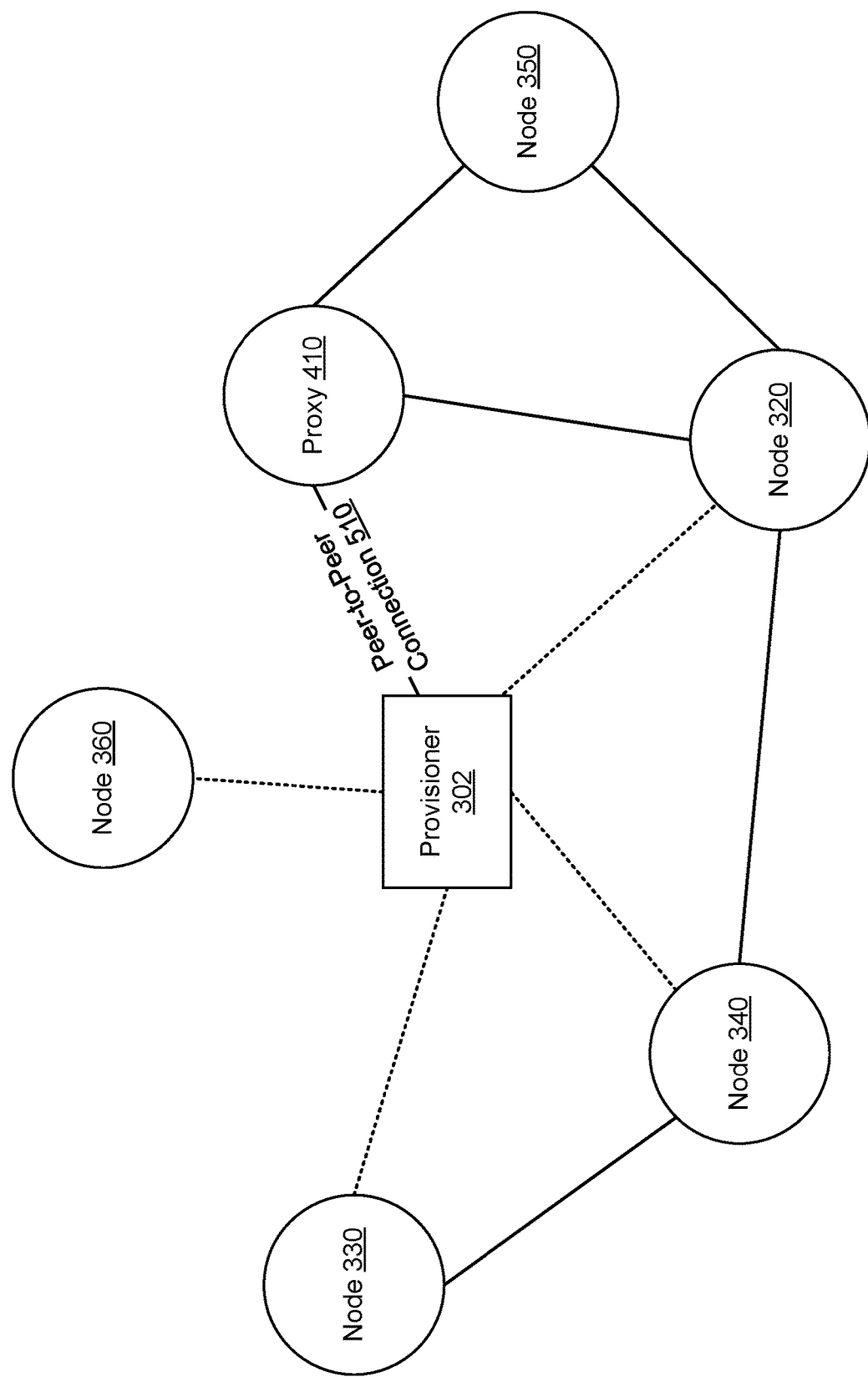
FIG. 5 illustrates an example of a proxy node selection and peer-to-peer connection in the Bluetooth mesh network of FIG. 3, according to embodiments of the present disclosure.

FIG. 5 illustrates an example of a proxy node selection and peer-to-peer connection in the Bluetooth mesh network 300 of FIG. 3, according to embodiments of the present disclosure. Here, the provisioner 302 has identified the single hop Bluetooth mesh nodes 310-340 and 360 (e.g., based on a scan as described in FIG. 4). Each of the single hop Bluetooth mesh nodes 310-340 and 360 can be potentially set as a proxy node. The network monitoring procedure includes connecting to each of the single hop Bluetooth mesh nodes 310-340 and 360 as a proxy node at a time, receiving connectivity data, and generating reachability data.

Here in FIG. 5 and upon the start of the network monitoring procedure, the provisioner 302 selects one of the single hop Bluetooth mesh nodes 310-340 and 360 (the illustrated selection is for the single hop Bluetooth mesh node 310) and establishes therewith a peer-to-peer connection 510 according to the Bluetooth standard, such as a GATT connection. Accordingly, the selected Bluetooth mesh node is set as a proxy node (illustrated in FIG. 5 by showing the single hop Bluetooth mesh node 310 as the proxy node 410 and dotting the edges to the remaining single hop Bluetooth mesh nodes 320-340 and 360).

Figure 6:
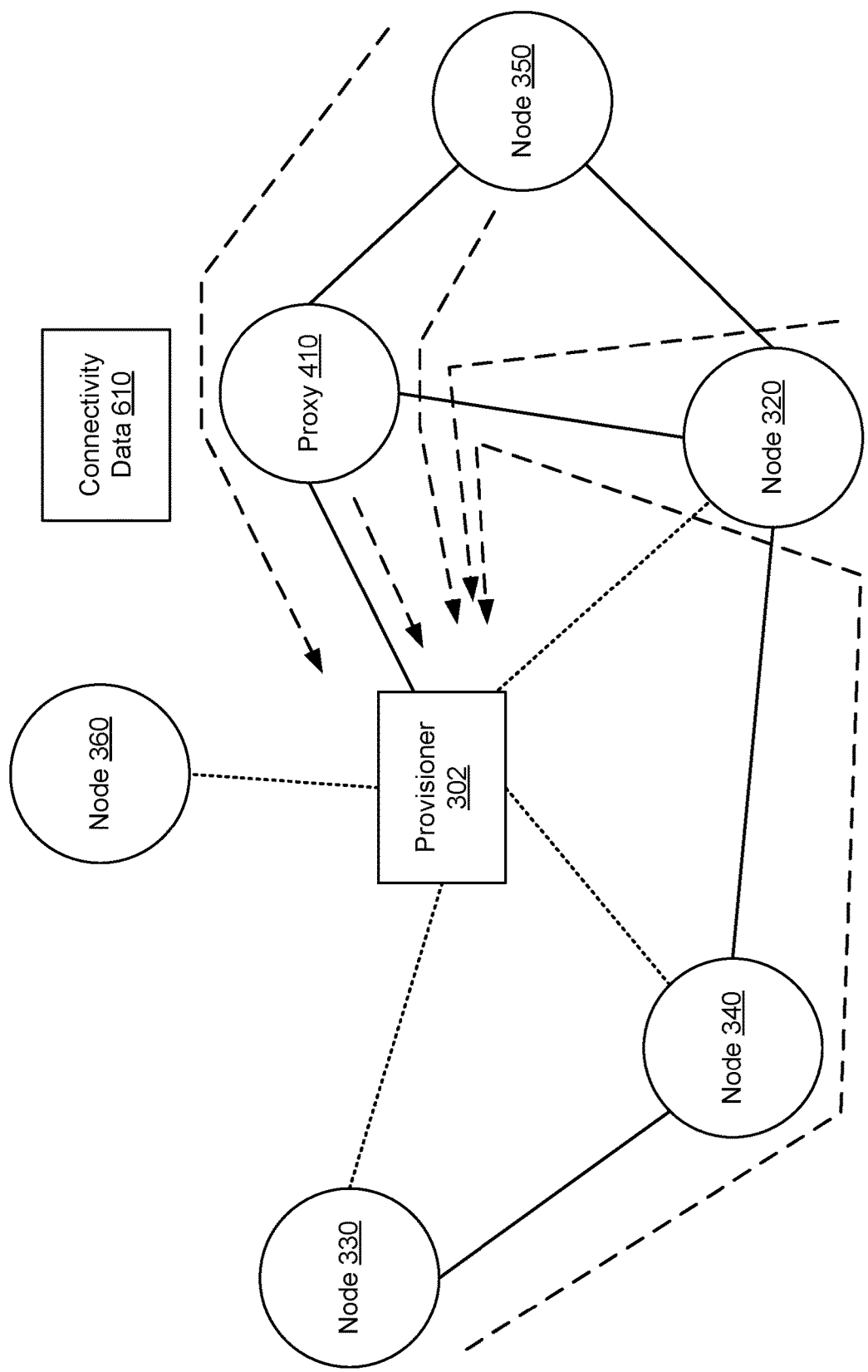
FIG. 6 illustrates an example of connectivity data received via the proxy node of FIG. 5, according to embodiments of the present disclosure.

FIG. 6 illustrates an example of connectivity data received via the proxy node of FIG. 5, according to embodiments of the present disclosure. Once the provisioner 302 has set up a proxy node, such as the proxy node 410 as in FIG. 5, the provisioner 302 receives connectivity data 610 from various Bluetooth mesh nodes of the Bluetooth mesh network 300 via the proxy node. Generally, the connectivity data of a Bluetooth mesh node is sent by the Bluetooth mesh node via the proxy node and includes an identifier of the Bluetooth mesh node, such as its Bluetooth mesh address, and information about the hop count (e.g., the number of hops) between the provisioner 302 and the Bluetooth mesh node.

As illustrated in FIG. 6, the connectivity data 610 is received from the proxy node 410 (indicating a Bluetooth mesh address of "1" and a hop count of one), from the Bluetooth mesh node 320 (indicating a Bluetooth mesh address of "2" and a hop count of two), from the Bluetooth mesh node 330 (indicating a Bluetooth mesh address of "3" and a hop count of four), from the Bluetooth mesh node 340 (indicating a Bluetooth mesh address of "4" and a hop count of three), from the Bluetooth mesh node 350 (indicating a Bluetooth mesh address of "5" and a hop count of two). No connectivity data is received from the Bluetooth mesh node 360 because this Bluetooth mesh node 360 is not reachable by the provisioner 302 via the proxy node 410. Nonetheless, such missing connectivity data can be received in another network monitoring iteration when, for instance, the provisioner 302 sets the Bluetooth mesh node 360 as a proxy node.

Based on the connectivity data 610, the provisioner 302 can generate reachability data indicating the Bluetooth mesh nodes reachable via the proxy node 410 and the associated number of hops. This reachability data can be stored in a data structure, as an in Table 1 below.

TABLE 1

| Single hop Bluetooth mesh address | Bluetooth mesh address | Total number of hops |
| --- | --- | --- |
| 1 | 1 | 1 |
|  | 2 | 2 |
|  | 3 | 4 |
|  | 4 | 3 |
|  | 5 | 2 |
|  | 6 | Not connected |

In Table 1, the left column identifies the Bluetooth mesh address of the proxy node (e.g., "1" because the proxy node 410 corresponds to the Bluetooth mesh node 310). The center column identifies the Bluetooth mesh address of the mesh node reachable by the provisioner 302 via the proxy node. The right column indicates the total number of hops between the provisioner 302 and the Bluetooth mesh node reachable via the proxy node.

In an example, the connectivity data of a Bluetooth mesh node is sent in one or more Bluetooth packets that correspond to either a Bluetooth message or a Bluetooth response depending on the type of the network monitoring procedure. The network monitoring procedure can be passive, where a Bluetooth message is received by the provisioner 302 periodically. Alternatively, the network monitoring procedure can be active, where the provisioner 302 sends a query (e.g., based on a trigger event, such as one of the trigger events described in connection with FIG. 5) and receives a Bluetooth response. Examples of the passive and active network monitoring procedures are further described in the next figures.

In both cases, the Bluetooth packet(s) can be health status packet(s) that include the Bluetooth mesh address of the mesh node and a time to live (TTL) value that indicates the hop count. In particular, during the provisioning, the provisioner 302 sets a TTL value for each of the Bluetooth mesh nodes (e.g., the TTL value for Bluetooth mesh node 320 is set to "10"). When a Bluetooth packet is relayed forward by an intermediary Bluetooth mesh node, the TTL value is decreased by one. Upon receiving the Bluetooth packet, the provisioner 302 determines the Bluetooth mesh address of the sending Bluetooth mesh node, determines the received TTL value, and compares this TTL value to the known TTL value corresponding to the Bluetooth mesh address (e.g., the received TTL value for the Bluetooth packet of the Bluetooth mesh node 320 is "8," and the difference between the known TTL value of "10" and the received TTL value of "8" is "2" and indicates that the Bluetooth mesh node 320 is two hops away from the provisioner 302 via the proxy node 410).

Figure 7:
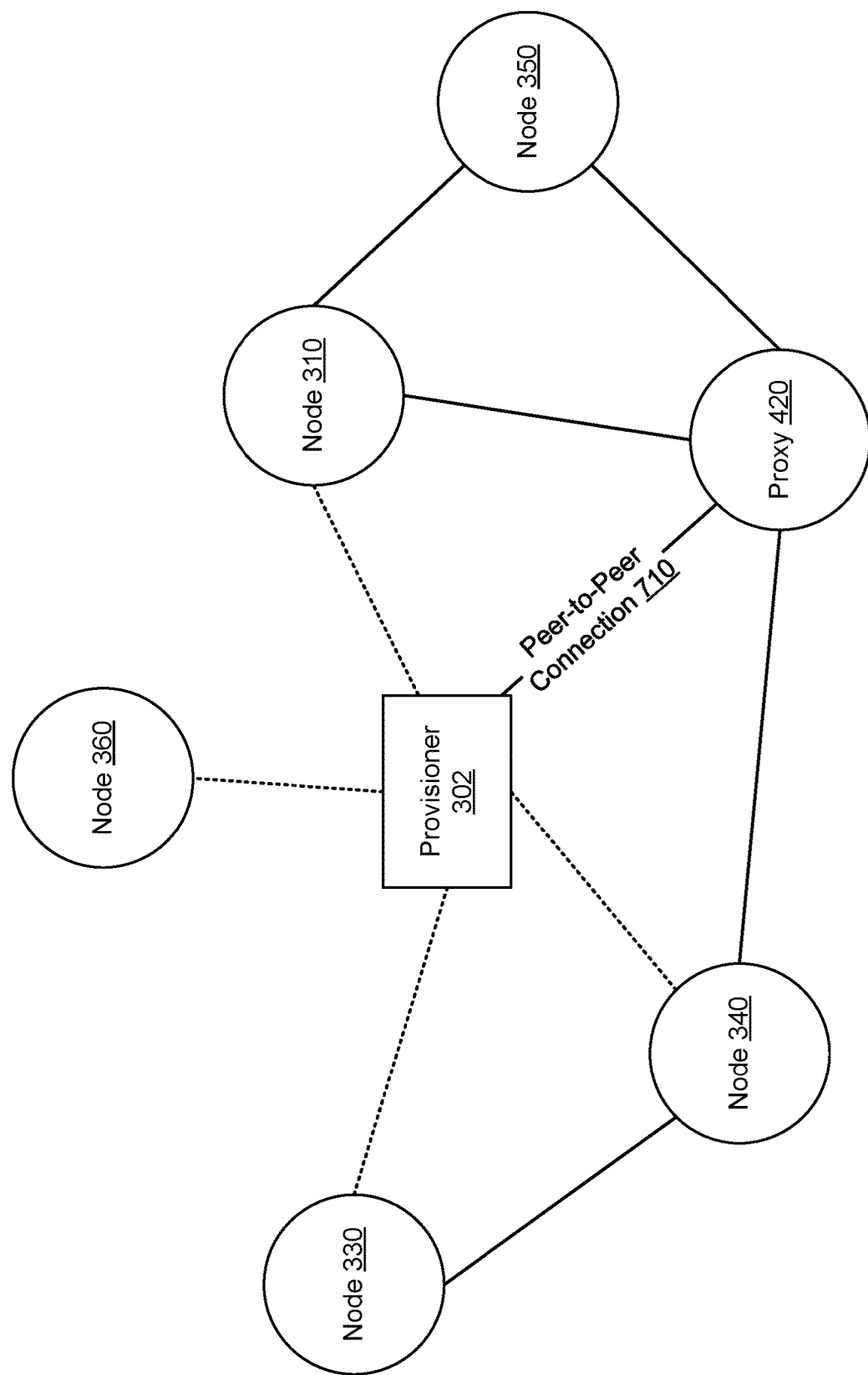
FIG. 7 illustrates another example of a proxy node selection and peer-to-peer connection in the Bluetooth mesh network of FIG. 3, according to embodiments of the present disclosure.

FIG. 7 illustrates another example of a proxy node selection and peer-to-peer connection in the Bluetooth mesh network of FIG. 3, according to embodiments of the present disclosure. The provisioner 302 has received the connectivity data 610 via the proxy node 410, as illustrated in FIG. 6. Accordingly, the provisioner 302 terminates the peer-to-peer connection 410 and, thus, the Bluetooth mesh node 310 is no longer set as a proxy node. In the next iteration of the network monitoring procedure, the provisioner 302 selects a next single hop Bluetooth mesh to set it as a proxy node and receive the relevant connectivity data. This is illustrated in FIG. 7 selecting the single hop Bluetooth mesh node 320 and setting a peer-to-peer connection 710 therewith, thereby setting this single hop Bluetooth mesh node 320 as a proxy node (illustrated as the proxy node 420 in reference to FIG. 4).

Various network monitoring iterations are repeated, where the provisioner 302 sets only one single hop Bluetooth mesh node as a proxy node per iteration and receives the connectivity data via this proxy node. Upon receiving the various connectivity data via the different proxy nodes across the network monitoring iterations, the provisioner 302 can generate full reachability data. This reachability data can be stored in a data structure, as an in Table 2 below. An entry in Table can correspond to a row that intersects the columns, where each row identifies an address of a single hop Bluetooth mesh node, the Bluetooth mesh node connected to the single hop Bluetooth mesh node, and the associated number of hops. Of course, another structure can be used, where an entry corresponds to a column rather than a row, for instance.

TABLE 2

| Single hop Bluetooth mesh address | Bluetooth mesh address | Total number of hops |
|---|---|---|
| 1 | 1 | 1 |
|   | 2 | 2 |
|   | 3 | 4 |
|   | 4 | 3 |
|   | 5 | 2 |
| 2 | 1 | 2 |
|   | 2 | 1 |
|   | 3 | 3 |
|   | 4 | 2 |
|   | 5 | 2 |
| 3 | 1 | 4 |
|   | 2 | 3 |
|   | 3 | 1 |
|   | 4 | 2 |
|   | 5 | 4 |
| 4 | 1 | 3 |
|   | 2 | 2 |
|   | 3 | 2 |
|   | 4 | 1 |
|   | 5 | 3 |
| 6 | 6 | 1 |

Although embodiments described in connection with FIG. 7 illustrate that the reachability data includes a computed number of hops (e.g., the third column in Table 2), the embodiments are not limited as such. Instead, this number may not be computed, or if computed, may be replaced with a default value. For instance, for any node that is a single hop away, a first default value of "one" (or some other default) can be used. For any node that is multiple hops away, a second default value of "two" (or some other default) can be used independently of the actual number of hops. In yet another illustration, the third column of Table 2 may not be computed in the first place and may not be stored.

Figure 8:
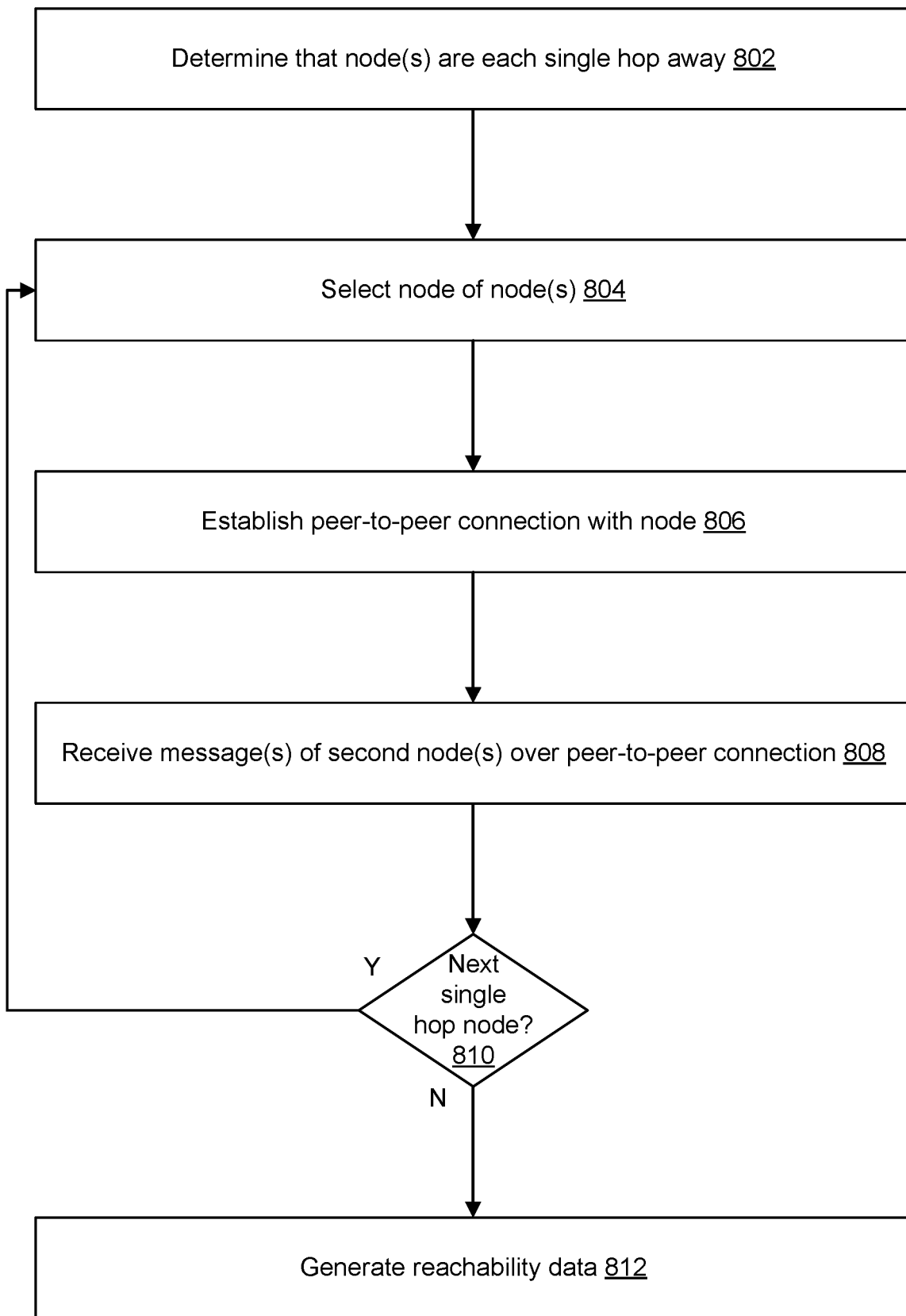
FIG. 8 illustrates an example of a flow for passive network monitoring in a Bluetooth mesh network, according to embodiments of the present disclosure.
Figure 9:
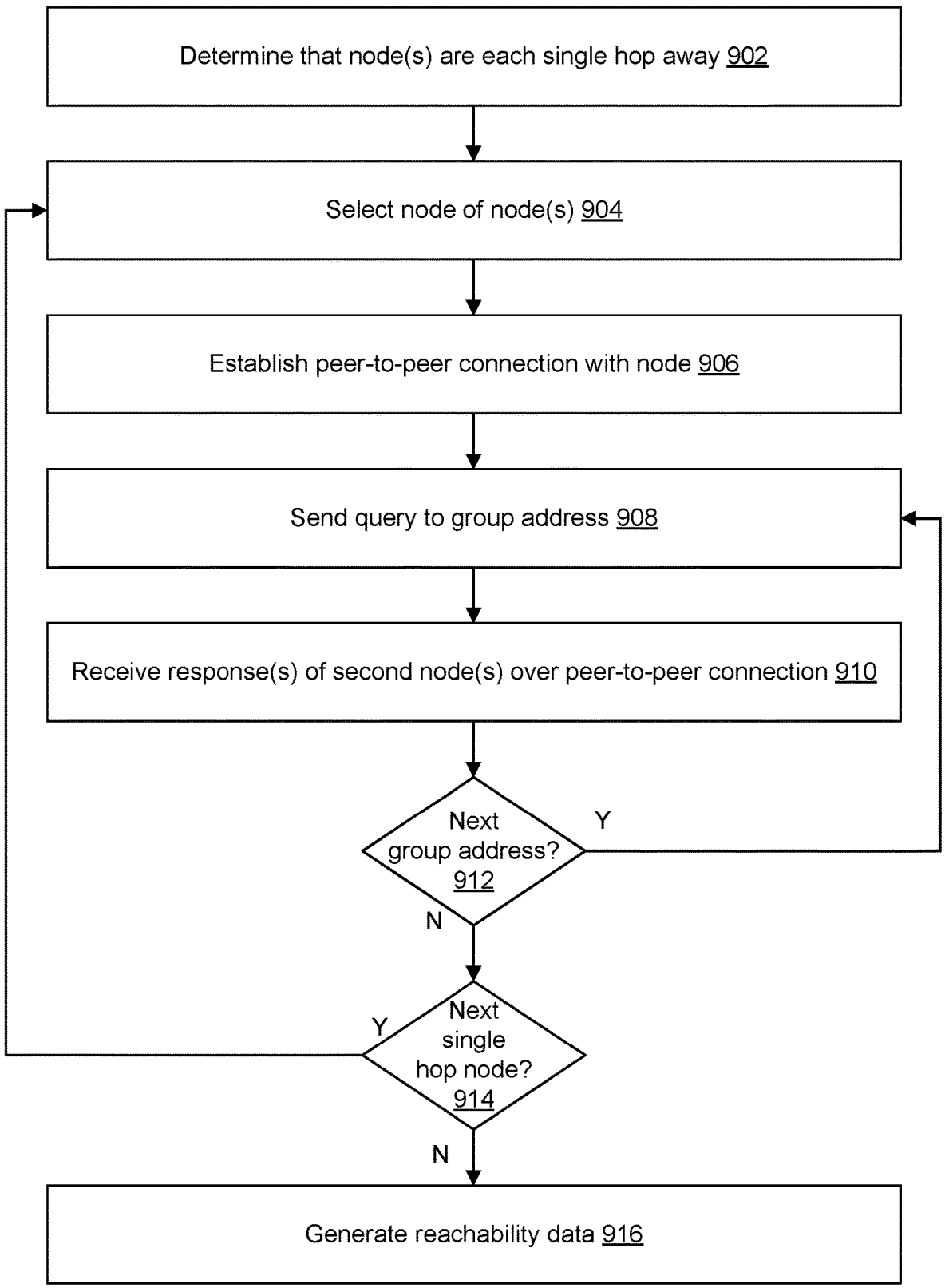
FIG. 9 illustrates an example of a flow for active network monitoring in a Bluetooth mesh network, according to embodiments of the present disclosure.

FIGS. 8-9 illustrate examples of flows for performing a network monitoring procedure, in accordance with various embodiments. Some or all of instructions for performing the operations of the flows can be implemented as hardware circuitry and/or stored as computer-readable instructions on a non-transitory computer-readable medium of a computing device, such as the computing device 110 of FIG. 1 or the provisioner 302 of FIGS. 3-7. As implemented, the instructions represent modules that include circuitry or code executable by a processor(s) of the computing device. The use of such instructions configures the computing device to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 8 illustrates an example of a flow for passive network monitoring in a Bluetooth mesh network, such as the Bluetooth mesh network 100 or 300, according to embodiments of the present disclosure. As illustrated, the example flow starts at operation 802, where the computing device determines a set of Bluetooth mesh nodes, each of which being a single hop away from the computing device. For instance, the computing device may perform a scan of neighboring Bluetooth mesh nodes and, upon receiving Bluetooth device addresses, connect to each of such Bluetooth mesh nodes, send a Bluetooth control message, and receive a Bluetooth mesh address that the computing device then maps to the Bluetooth device address. In another illustration, the computing device may look-up reachability data generated and stored following a previously performed network monitoring procedure, and determine the single hop Bluetooth mesh nodes from this data.

In an example, the flow also includes operation 804, where the computing device selects one of the nodes from the set identified at operation 802. For instance, the computing device performs the selection according to an ascending order of the Bluetooth mesh addresses of such single hop Bluetooth mesh nodes.

In an example, the flow also includes operation 806, where the computing device establishes a peer-to-peer connection with the selected Bluetooth mesh node. For instance, the computing device establishes a GATT connection with the selected Bluetooth mesh node, thereby setting this Bluetooth mesh node as a proxy node.

In an example, the flow also includes operation 808, where the computing device receives message(s) of second Bluetooth mesh nodes over the peer-to-peer connection. For instance, because the network monitoring procedure is passive, the computing device waits for health status messages from the proxy node and from each of the Bluetooth mesh nodes reachable via the proxy node. A health status message from a Bluetooth mesh node can be sent as a periodic ping and may include the Bluetooth mesh address of the Bluetooth mesh node and a hop count indicating the total number of hops between the computing device and the Bluetooth mesh node. The use of health messages is provided for illustrative purposes. Other types of messages can be similarly used, such as heartbeat messages.

In an example, the flow also includes operation 810, where the computing device determines whether a next single hop Bluetooth node can be connected thereto as a proxy node. If all the single hop Bluetooth mesh nodes have already been connected to as proxy nodes, operation 812 can follow operation 810. Otherwise, operation 804 follows operation 810, where the computing device selects the next single hop Bluetooth mesh node for a peer-to-peer connection therewith. To do so, the computing devices terminates the existing peer-to-peer connection and establishes a new peer-to-peer connection with the next single hop Bluetooth mesh node.

In an example, the flow also includes operation 812, where the computing device generates reachability data. For instance, the computing device at this point has received the different health status messages (e.g., a form of connectivity data) of the different Bluetooth mesh nodes and via the different proxy nodes. The computing device generates a reachability data structure, such as the example Table 2 above, identifying each single hop Bluetooth mesh node, the multiple hops Bluetooth mesh nodes connected thereto, and the number of hops.

FIG. 9 illustrates an example of a flow for active network monitoring in a Bluetooth mesh network, according to embodiments of the present disclosure. In comparison to the passive network monitoring procedure, such as the one described in connection with FIG. 8, an active network monitoring procedure can reduce the time or latency needed to generate reachability data. In particular, rather than waiting for periodic pings that include health status messages, the computing device can actively query such status messages. Further, multiple proxy nodes can be simultaneously set (e.g., multiple peer-to-peer connections can coexist), thereby further reducing the time or latency. In addition, the passive network monitoring procedure, health status messages may not be received from all the Bluetooth mesh nodes and, thus, the computing device may erroneously determine that these Bluetooth mesh nodes are disconnected. In comparison, such likelihood of error is significantly reduced in the active network monitoring procedure.

As illustrated, the example flow of FIG. 9 starts at operation 902, where the computing device determines a set of Bluetooth mesh nodes, each of which being a single hop away from the computing device. This operation 902 can be similar to operation 802. The use of scanning can also resolve issues related to dynamic changes of the Bluetooth device addresses.

In an example, the flow also includes operation 904, where the computing device selects one of the nodes from the set identified at operation 902. This operation 904 can be similar to operation 804.

In an example, the flow also includes operation 906, where the computing device establishes a peer-to-peer connection with the selected Bluetooth mesh node. This operation 906 can be similar to operation 806.

In an example, the flow also includes operation 908, where the computing device sends a query to a group address. For instance, the query can include a request for a particular type of response and include a first code. The code can be associated with the requested response type. Upon receiving the query and if addressed to it, a Bluetooth mesh node looks up the first code, determines the type, and sends a response according to the determined type. The response can include a second code associated with the response type. The computing device receives the response, looks up the second code, and determines that the second code is associated with the response type and, thus, with the query. Accordingly, the computing device further processes the response to determine the Bluetooth mesh address of the Bluetooth mesh and the hop count. In an illustrations, the codes used in the query and responses are opcodes set according to the Bluetooth standard. In an illustration, the query requests a health status report.

Furthermore, during the provisioning, the computing device can assign a group address to groups of the Bluetooth mesh nodes and can send that group address to the Bluetooth mesh nodes belonging to the group. For instance, and referring back to the Bluetooth mesh network 300, the Bluetooth mesh nodes 310-330 can be assigned to a first group having a group address of "16,000" and the Bluetooth mesh nodes 340-360 can be assigned to a second group having a group address of "17,000." Upon setting the Bluetooth mesh node 310 as a proxy node, a query sent to the first group address can be received by the Bluetooth mesh nodes 310-350 (but not the Bluetooth mesh node 360 given the network topology). Only Bluetooth mesh nodes 310-330 may respond to the query because each of such Bluetooth mesh nodes 310-330 can determine a match between the group address of the query and their group address. Bluetooth mesh nodes 340-350 may ignore the query and not respond. Of course, depending on the number of Bluetooth mesh, the computing device can set up a different number of groups. For instance, if the number of Bluetooth mesh nodes is small (e.g., ten), one group address may be used. If the number of Bluetooth mesh nodes is large (e.g., fifty), four or five group addresses may be used.

In an example, the flow also includes operation 910, where the computing device receives message(s) of second Bluetooth mesh nodes over the peer-to-peer connection. As explained herein above, each of the Bluetooth mesh nodes reachable via the proxy node receives the query, looks up the group address and, only if matching to its group address, sends a response. The response can be of the requested type. For instance, a response about the health status report is sent if the query requests stop. The computing device receives the responses of the Bluetooth mesh nodes that belong to the queried group, where the responses are received via the proxy node and over the peer-to-peer connection.

In an example, the flow also includes operation 912, whether a next group address can be queried. If queries have already been sent to all the group provisioned by the computing device, operation 914 can follow operation 912. Otherwise, operation 908 follows operation 912, where the computing device sends a query to the next group address via the proxy node and over the already established peer-to-peer connection.

In an example, the flow also includes operation 914, where the computing device determines whether a next single hop Bluetooth node can be connected thereto as a proxy node. If all the single hop Bluetooth mesh nodes have already been connected to as proxy nodes, operation 916 can follow operation 914. Otherwise, operation 904 follows operation 914, where the computing device selects the next single hop Bluetooth mesh node for a peer-to-peer connection therewith. Here, the computing node need not terminate the existing peer-to-peer connection and can establish a new peer-to-peer connection with the next single hop Bluetooth mesh node. Alternatively, operations 904-906 and 914 can be collapsed together, where the computing device establishes simultaneous peer-to-peer connections, each with one of the single hop Bluetooth mesh nodes. When multiple peer-to-peer connections coexist, the computing device sends a query to a single proxy node and receives the responses prior to sending a next query to a next proxy node. Alternatively, the query can be sent in parallel, each including a different code such that each response can be tracked back to one of the sent queries.

In an example, the flow also includes operation 916, where the computing device generates reachability data. This operation 916 can be similar to operation 812.

Although the flow of FIG. 9 describes selecting a proxy node and establishing a peer-to-peer connection with the proxy node to send a query, embodiments of the present disclosure are not limited as such. Instead, multiple peer-to-peer connections may coexist, each with a proxy node. A particular proxy node can be selected and a query can be sent over the corresponding peer-to-peer connection and via this particular proxy node. A response to the query need not be received back via the particular proxy node and over the corresponding peer-to-peer connection. Instead, the response can be received via any of the other proxy nodes and over the peer-to-peer connection with this other proxy node. In this way, other operations of the Bluetooth mesh network may not be interrupted or impacted including, for instance, the transmission of user data within the Bluetooth mesh network.

Figure 10:
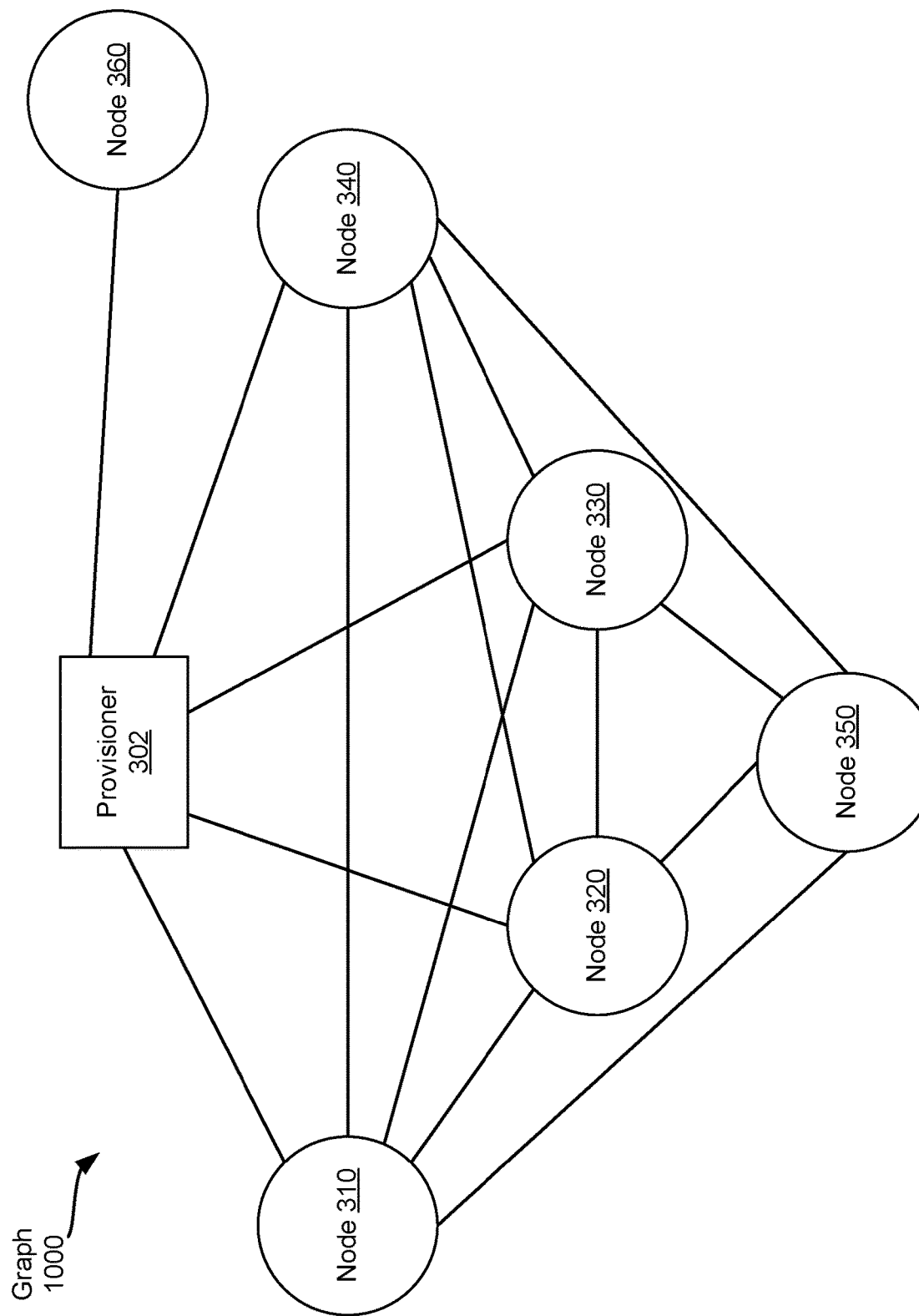
FIG. 10 illustrates an example of a graph in support of proxy node selection, according to embodiments of the present disclosure.

FIG. 10 illustrates an example of a graph 1000 in support of proxy node selection, according to embodiments of the present disclosure. Once reachability data is generated upon completion of a network monitoring procedure, a provisioner (described herein forward as the provisioner 302 in reference to the Bluetooth mesh network 300) can perform a proxy node selection algorithm to generate proxy data indicating proxy nodes that are to be used to reach the different Bluetooth mesh nodes. As explained herein above, each Bluetooth mesh that is a single hop away from the provisioner 302 can be potentially set as a proxy node. Generally, the proxy node selection algorithm attempts to reduce or minimize the total number of proxy nodes by carefully selecting some of the single hop Bluetooth mesh node to be proxy nodes and setting the remaining ones as multiple hops Bluetooth mesh nodes reachable through the proxy nodes. For instance, and referring to the Bluetooth mesh network 300, four Bluetooth mesh nodes can be set as proxy nodes: Bluetooth mesh node 310, Bluetooth mesh node 320, Bluetooth mesh node 330, and Bluetooth mesh node 340. As illustrated in the next figures, it is possible to set only two proxy nodes instead of four (e.g., Bluetooth mesh node 320 and Bluetooth mesh node 360), while ensuring that all the Bluetooth mesh nodes 310-360 remain reachable and can be connected via the two proxy nodes. By reducing or minimizing the number of proxy nodes, hardware resource usage of the computing device can be improved.

In an example, the provisioner 302 generates the graph 1000 as a part of the proxy node selection procedure. The graph 1000 can be an undirected graph, where the provisioner 302 is represented as a root node, and where each of the Bluetooth mesh nodes 310-360 is represented as a graph node. Edges connect the graph nodes themselves and the graph nodes with the root node depending on the Bluetooth network paths in the topology of the Bluetooth mesh network 300. For instance, an edge connects the root node with a graph node corresponding to a Bluetooth mesh node if such a Bluetooth mesh node is a single hop away from the provisioner 302 and can be connected thereto by establishing a peer-to-peer connection.

In the particular illustration of the Bluetooth mesh network 300, the Bluetooth mesh nodes 310-340 and 360 are each a single hop away from the provisioner. Hence, five corresponding graph nodes are added to the graph 1000, each corresponding to one of the Bluetooth mesh nodes 310-340 and 360 and each connected with an edge to the root node. Also in the particular illustration of the Bluetooth mesh network 300, no network path exists between the Bluetooth mesh node 360 and the remaining Bluetooth mesh nodes 310-350 and a network path exists between the Bluetooth mesh nodes 310 and 350. According, no edges connect the graph node corresponding to the Bluetooth mesh node 360 to the other graph nodes, and a graph node corresponding to the Bluetooth mesh node 350 is added to the graph 1000 and is connected via an edge with the graph node corresponding to the Bluetooth mesh node 310.

In addition, each of the edges has a weight. The provisioner 302 can set the weight depending on the corresponding total number of hops indicated by the reachability data. For instance, and referring back to the edge between the graph nodes corresponding to the Bluetooth mesh nodes 310 and 350, that edge indicates that Bluetooth mesh 350 can be reached by the provisioner 302 via the Bluetooth mesh node 310 when this Bluetooth mesh node 310 is set as a proxy node. The equivalent total number of hops for that type of connection is "2" as indicated by the equivalent entry in Table 2, copied herein below as Table 3:

TABLE 4

| Single hop Bluetooth mesh address | Bluetooth mesh address | Total number of hops |
| --- | --- | --- |
| 1 | 5 | 2 |

The goal of the proxy node selection procedure is to reduce (e.g., minimize) the number of proxy nodes. The edges corresponding to the potential proxy nodes are the edges that connect the root node with the graph nodes. Based on the reachability data, the number of hops corresponding to each of such edges is "1" (intuitively, because each of such graph node corresponds to a single hop Bluetooth mesh node). To bias the proxy node selection procedure in a way to achieve the goal, the weight of these edges are increased to a much higher weight (while the eights of edges between the graph nodes remain equal to the hop counts). By doing so, the proxy node selection procedure can use a minimum spanning tree (MST) algorithm that selects edges such that the graph 1000 is connected while the total weight cost is minimized. Because higher weights are assigned to edges between the provisioner 302 and the single hop Bluetooth mesh nodes, as represented in the graph 1000, the MST algorithm results in a connected graph with the minimum number of edges and where an edge with the provisioner 302 is only selected if necessary to make the graph connected.

In an example, the weight of an edge connected to the root node is set based on predefined maximum weight and a number of hops. The predefined weight can be set a function of the maximum number of hop counts possible by the Bluetooth mesh specification. This maximum number is one-hundred twenty-seven. Accordingly, the predefined maximum weight can be set to be equal to or larger than one-hundred twenty-seven. In an example, the predefined maximum weight is set to one-hundred twenty-eight.

The number of hops can be set as a value for an alpha, where the alpha is a variable that can be set as the sum of the hop counts of the edges (e.g., the weight of these edges) connected to the graph node other than the edge with the root node. In another example, the alpha can be defined independently of the number of hops. For instance, the alpha can be random within a range between zero and the predefined maximum weight (e.g., one-hundred twenty eight). In another illustration, the alpha can depend on the number of nodes that the proxy node can reach, such as the sum of the number connected graph nodes to the proxy node or an inverse of that sum (e.g., node 320 has four connections to other nodes in the graph 1000: one to node 310, one to node 330, one to node 340, and one to node 350. In this case, the alpha for node 320 is set to four or "¼").

To illustrate, consider the example of the single hop Bluetooth node 320. The weight of the edge connecting the corresponding graph node to the root node is equal to the predefined maximum weight of one-hundred twenty-eight plus alpha, where the value of alpha depends on the weights of the edges connecting this graph node to the graph nodes corresponding to Bluetooth hop nodes 310 and 330-340. From the reachability data of Table 2 (the relevant entries are copied herein below as Table 4), the alpha is equal to the sum of two, three, two, and two or a total of nine. Hence, the weight of the edge of the single hop between the Bluetooth mesh node 320 and the provisioner 302 is one-hundred thirty-seven.

TABLE 4

| Single hop Bluetooth mesh address | Bluetooth mesh address | Total number of hops |
|---|---|---|
| 2 | 1 | 2 |
|  | 3 | 3 |
|  | 4 | 2 |
|  | 5 | 2 |

Similar weights can be computed for the remaining edges connected to the root node, resulting in the weights of one-hundred thirty-nine, one-hundred forty-three, one-hundred thirty-eight, and one one-hundred twenty-eight for the edges of the single hops between the Bluetooth mesh nodes 310, 330, 340, and 360 and the provisioner 302.

Although embodiments of FIG. 10 describe using the number of hops from the reachability data to generate the graph 1000, the embodiments are not limited as such. For instance, it may be sufficient to use the Bluetooth mesh addresses without using the number of hops from the reachability data (e.g., to use the first two columns of Table 1). For a mesh node that is more than one hop away from the provisioner 302, the corresponding number of hops can be defaulted to a value of two or some other predefined value, regardless of the actual number of hops (e.g., the values in the third column of Table 1 other than one are updated to two or some other predefined value).

Figure 11:
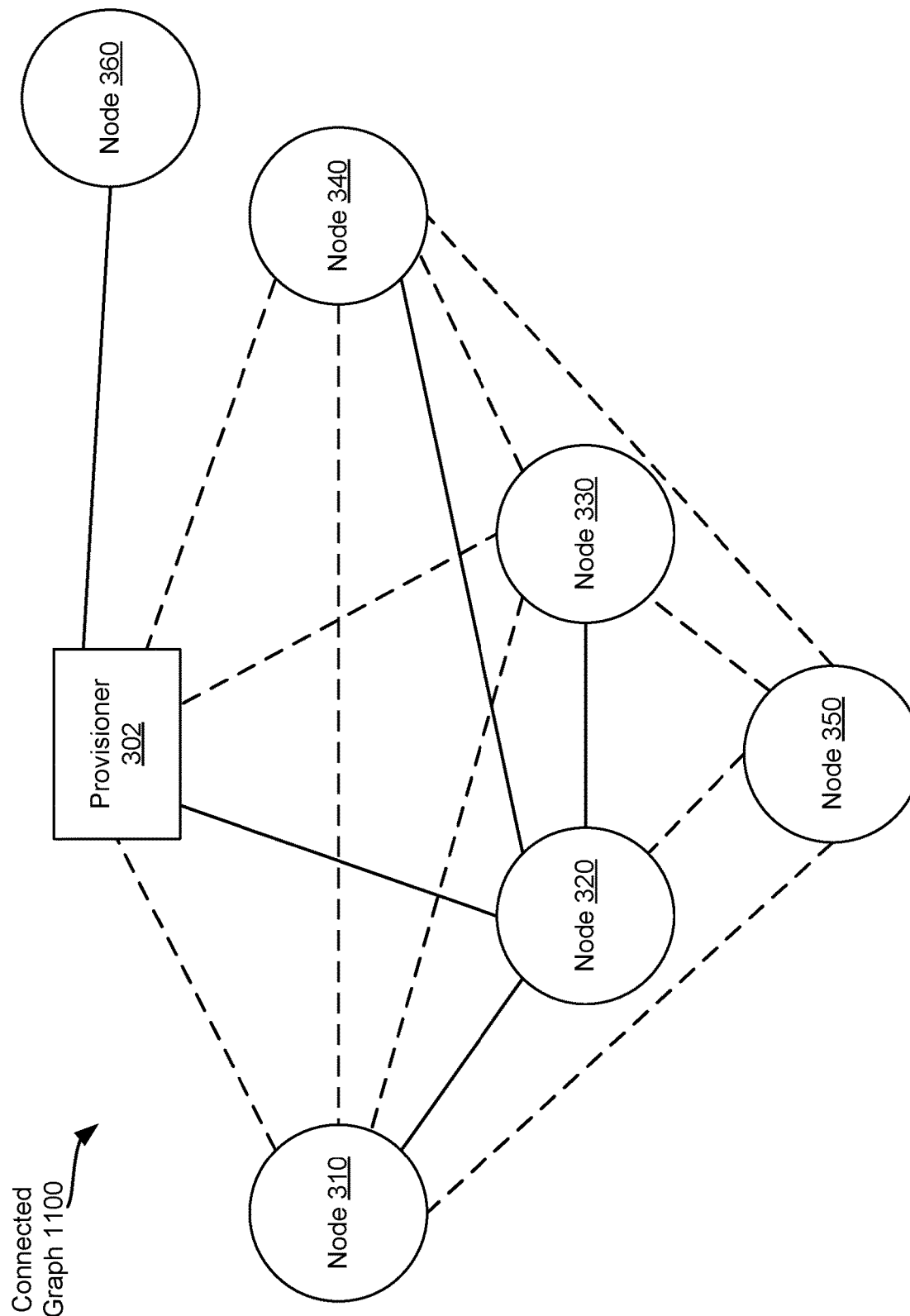
FIG. 11 illustrates an example of proxy node selection based on the graph of FIG. 10, according to embodiments of the present disclosure.

FIG. 11 illustrates an example of proxy node selection based on the graph of FIG. 10, according to embodiments of the present disclosure. Here, the provisioner 302 has generated the graph 1000, including the weights of the edges as described in connection with FIG. 10. According to the proxy node selection procedure, the provisioner 302 invokes the MST algorithm to select the single hop nodes to use as proxy nodes. The result of performing the MST algorithm is a connected graph 1100 that identifies the proxy nodes to be used and the multiple hop Bluetooth nodes reachable via these proxy nodes.

In a first iteration, the MST algorithm starts by selecting the edge connected to the root node and having the smallest weight. The graph node connected to that edge is identified, and the graph nodes connected to this graph node are also identified. These graph nodes and the corresponding edges represent selected network paths and are removed from the graph 1000 at the end of the first iteration. In the next iteration, the MST algorithm repeats the selection by selecting one of the remaining edges that has the next smallest weight, and so on. The iterations continue until all the graph nodes until a determination that network paths have been selected for all the Bluetooth mesh nodes.

To illustrate, and referring back to the weights of the four edges connected to the root node, the MST algorithm selects in the first iteration the edge to the graph node corresponding to the Bluetooth mesh node 360 because its value of one-hundred twenty-eight is the smallest. No edges connect this graph node to other nodes. Hence, at the end of the first iteration, the provisioner determines that Bluetooth mesh node 360 is to be set as a proxy node and that no other Bluetooth mesh nodes can be reached via this proxy node. The edge and the graph node are removed. In the second iteration, four edges connected with the root node remain and correspond to the Bluetooth mesh nodes 310-340. Here, the MST algorithm selects the edge to the graph node corresponding to the Bluetooth mesh node 320 because its value of one-hundred thirty-seven is now the smallest. Upon selecting this graph node, the MST algorithm determines that the graph nodes of the remaining Bluetooth mesh nodes 310 and 330-350 are connected thereto. All these graph nodes and the connecting edges are removed at the end of the second iteration. By the end of the second iteration, the provisioner 302 determines that all the Bluetooth mesh nodes are now connected and, thus, stops the MST algorithm.

The two iterations result in the connected graph 1100 illustrated in FIG. 11. In particular, the graph node corresponding to the Bluetooth mesh node 360 is connected with the root node (as shown with the solid line). The graph node corresponding to the Bluetooth mesh node 320 is connected with the root node (as shown with the solid line), and the remaining graph nodes are connected to this graph node (as also shown with the solid lines). The remaining edges are removed (as shown with the dashed lines).

Figure 12:
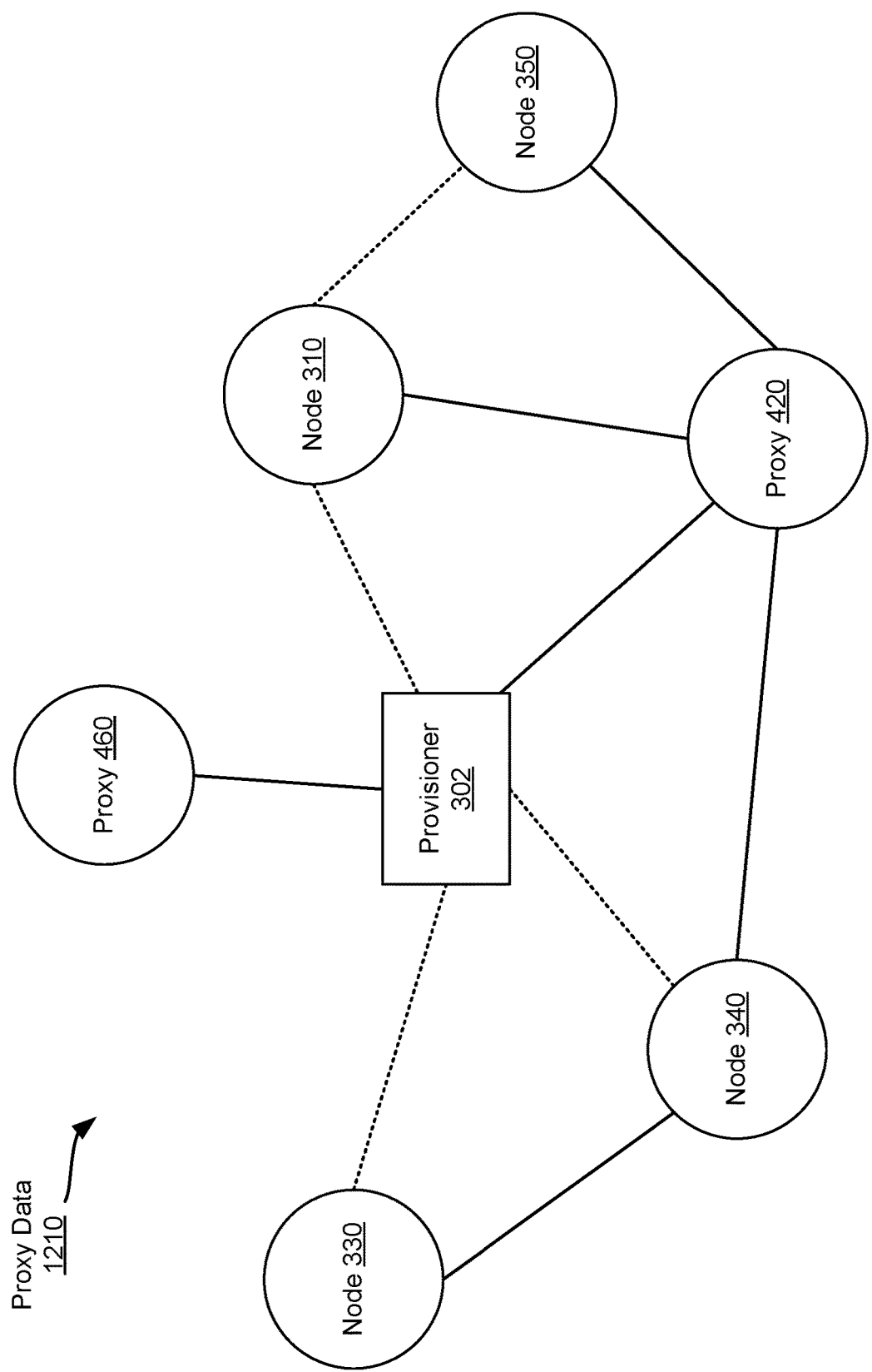
FIG. 12 illustrates an example of a topology of the Bluetooth mesh network of FIG. 3 upon completion of proxy node selections, according to embodiments of the present disclosure.

FIG. 12 illustrates an example of a topology of the Bluetooth mesh network of FIG. 3 upon completion of proxy node selections, according to embodiments of the present disclosure. Here, the provisioner 302 can translate the connected graph 1100 into the topology shown in FIG. 12 and in proxy data 1210. In particular, and based on the connected graph 1100, the provisioner 302 determines that the smallest number of proxy nodes allowing all Bluetooth mesh nodes to be connected is two and these proxy nodes are Bluetooth mesh nodes 320 and 360 (shown in FIG. 12 as proxy nodes 420 and proxy node 460). Also based on the connected graph 1100, the provisioner 302 determines that the Bluetooth mesh nodes 310, 340, and 350 can be connected in a single hop away to the proxy node 420 and that the Bluetooth mesh node 330 can be connected to the proxy node 420 in two hops via the Bluetooth mesh node 340 as an intermediary node.

The provisioner 302 generates the proxy data 1210 that represent this topology. This proxy data 1210 can be stored in a data structure, as an in Table 5 below.

TABLE 5

| Bluetooth mesh address of proxy node | Bluetooth mesh address of connected mesh node |
|---|---|
| 2 | 1 |
|  | 2 |
|  | 3 |
|  | 4 |
|  | 5 |
| 6 | 6 |

Figure 13:
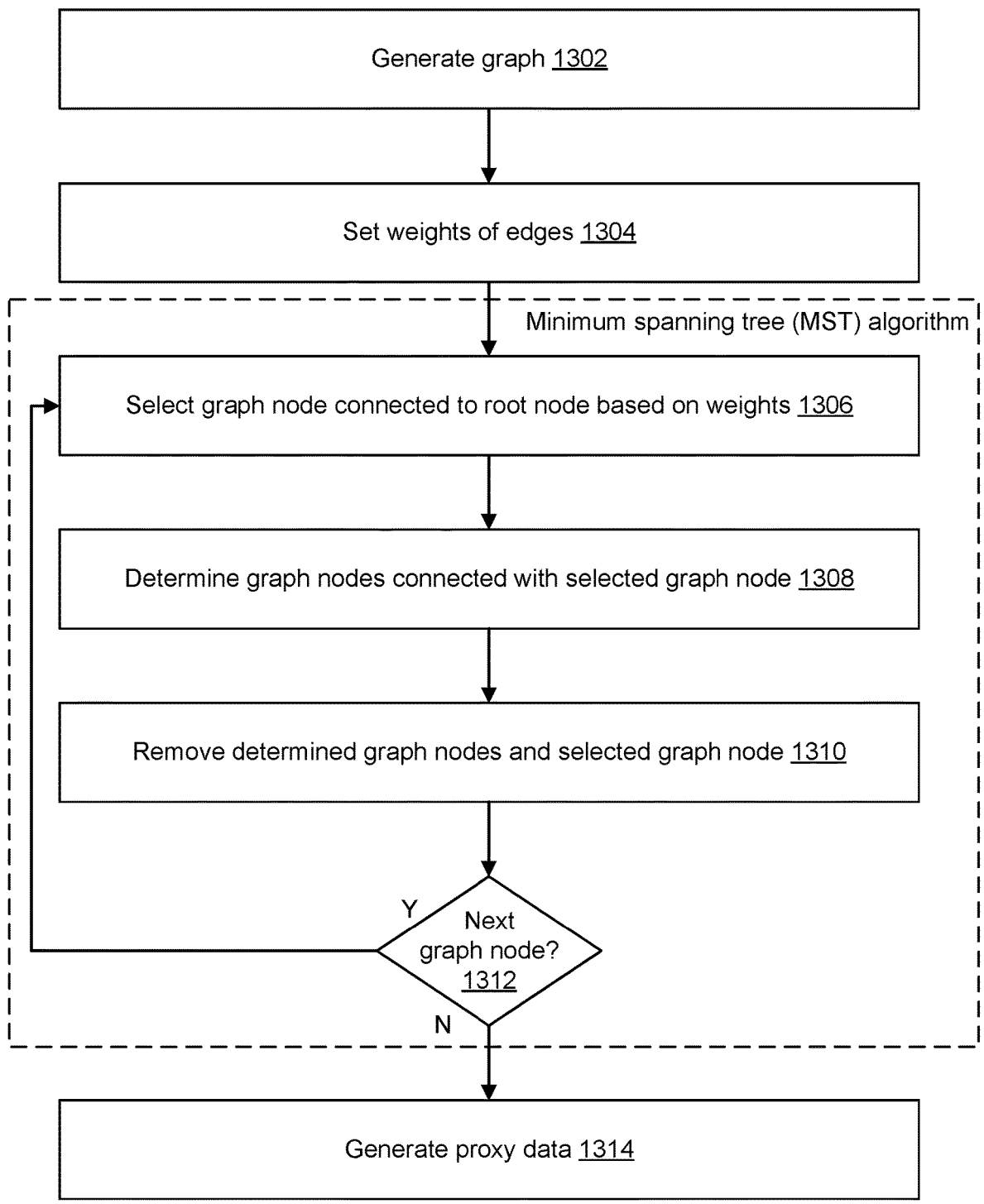
FIG. 13 illustrates an example of a flow for selecting proxy nodes in a Bluetooth mesh network, according to embodiments of the present disclosure.
Figure 14:
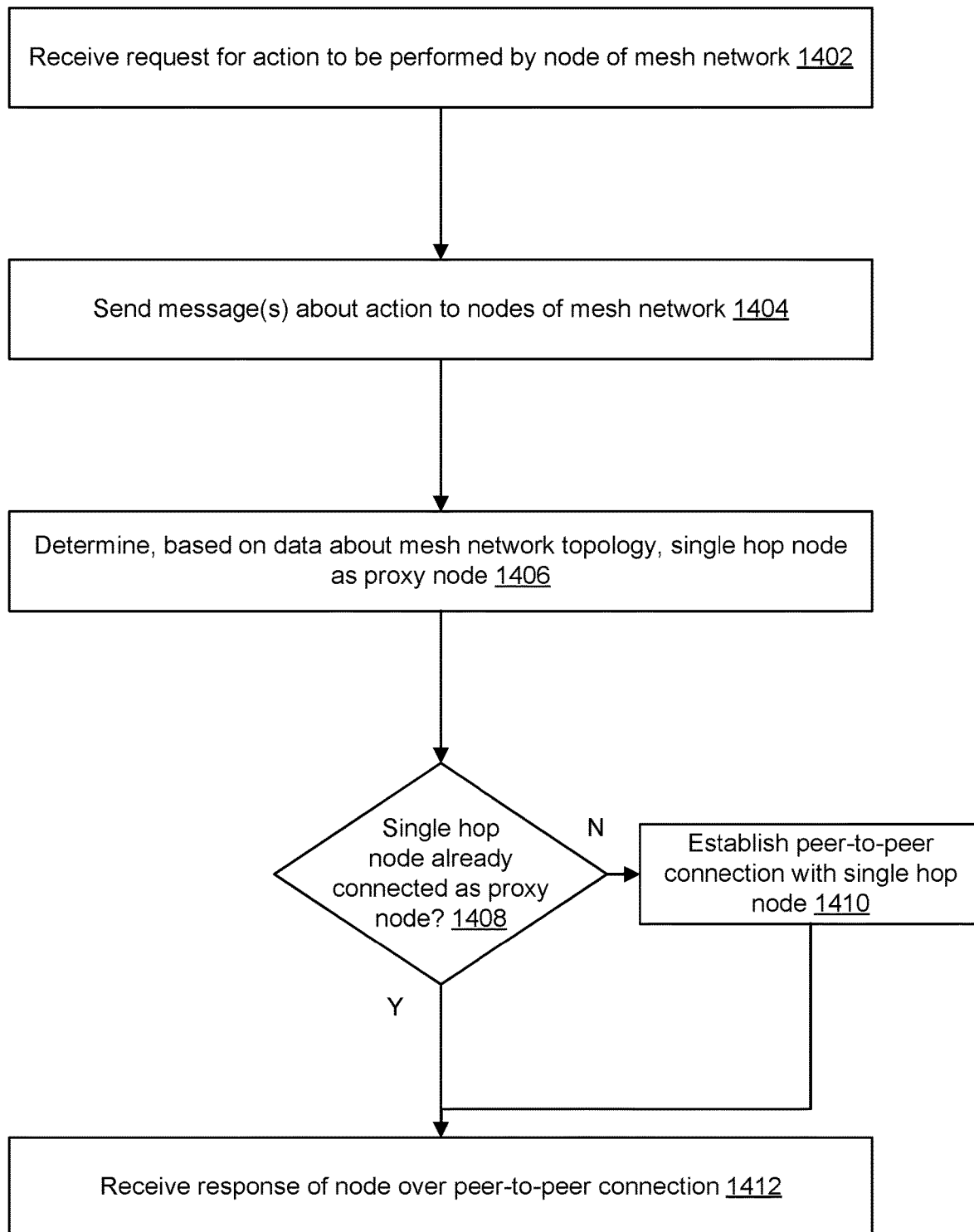
FIG. 14 illustrates an example of a flow for sending a message to a node in a Bluetooth mesh network and receiving a response from the node, according to embodiments of the present disclosure.

FIGS. 13-14 illustrate examples of flows for performing a proxy node selection procedure and for sending packets in accordance with various embodiments. Some or all of instructions for performing the operations of the flows can be implemented as hardware circuitry and/or stored as computer-readable instructions on a non-transitory computer-readable medium of a computing device, such as the computing device 110 of FIG. 1 or the provisioner 302 of FIGS. 3-7 and 10-12. As implemented, the instructions represent modules that include circuitry or code executable by a processor(s) of the computing device. The use of such instructions configures the computing device to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 13 illustrates an example of a flow for selecting proxy nodes in a Bluetooth mesh network, such as the Bluetooth mesh network 100 or 300, according to embodiments of the present disclosure. As illustrated, the example flow starts at operation 1302, where the computing device generates a graph, such as an undirected graph, based on reachability data. For instance, the computing device is represented as a root node in the graph. Each of the Bluetooth mesh nodes is represented as a graph node. A graph node is connected to the root node with an edge if the corresponding Bluetooth mesh node can be a single hop away from the computing device. A graph node is connected with another graph node with an edge if the corresponding two Bluetooth mesh nodes can be connected directly.

In an example, the flow also includes operation 1304, where the computing device sets weights for the edges. For instance, the weight of an edge connecting two graph nodes is set based on the total number of hops from the equivalent entry in the reachability data. The weight of an edge connecting a graph node (e.g., corresponding to a proxy node) with the root node can be set as a sum of a maximum predefined weight and a variable alpha. The value of the variable alpha can be set, for instance, as the sum of all the weights of the edges connected to the graph node except of the edge between the graph node and the root node, as a random value, as the sum of the number of graph nodes connected to this graph node (e.g., the number of nodes that can be reached by the proxy node), or as inverse of the sum of the number of graph nodes connected to this graph node.

In an example, the flow also includes operation 1306, where the computing device selects a graph node connected to the root node based on the weights. For instance, the computing device invokes an MST algorithm. This MST algorithm can include operations 1306-1312 (as illustrated with the dashed rectangle in FIG. 13) and selects the graph node having the smallest weighted edge among the graph nodes connected to the root node.

In an example, the flow also includes operation 1308, where the computing device determines the graph nodes that are connected to the selected graph node, if any. For instance, if the graph indicates that the selected node has an edge to a second graph node, the second graph node is selected. Identifiers of the selected graph node and the graph nodes connected therewith are determined and can be, for instance, the Bluetooth mesh addresses of the corresponding Bluetooth mesh nodes. These identifiers and the topology between the corresponding Bluetooth mesh nodes (e.g., the Bluetooth mesh node corresponding to the selected graph node being set as a proxy node and the other Bluetooth mesh nodes being set as multiple hops Bluetooth mesh node reachable via the Bluetooth mesh node) can be added to proxy data.

In an example, the flow also includes operation 1310, where the computing device removes the determined graph nodes, if any, and the selected graph node (and the edge connected thereto) from the graph. This allows the computing device to proceed to the next iteration of the MST algorithm.

In an example, the flow also includes operation 1312, where the computing device determines whether a next graph node connected to the root node can be selected. If all such graph nodes have been removed, then no next MST algorithm iteration can be performed and operation 1314 can follow the operation 1312. Otherwise, operation 1306 can follow operation 1312, where the MST algorithm performs a next iteration by selecting one of the remaining graph nodes connected to the root node and having the smallest weighted edge.

In an example, the flow also includes operation 1314, where the computing device generates the proxy data. For instance, upon performing the various MST algorithm iterations, the computing device identifies the Bluetooth mesh nodes to be set as proxy nodes and the connections therewith of the remaining Bluetooth mesh nodes. The proxy data can be generated and stored in a data structure, such as the one described in connection with Table 5.

FIG. 14 illustrates an example of a flow for sending a message to a node in the Bluetooth mesh network and receiving a response from the node, according to embodiments of the present disclosure. In this flow, the computing device has already generated the reachability data (e.g., per the flows of FIGS. 9-10) and the proxy data (e.g., per the flow of FIG. 13).

In an example, the flow starts at operation 1402, where the computing device receives a request for action to be performed by a Bluetooth mesh node of the Bluetooth mesh network. For instance, the request is received based on user input, as described in connection with FIG. 1.

In an example, the flow also includes operation 1404, where the computing device sends one or more messages about the actions to the nodes of the mesh network. For instance, the computing device can generate a message that includes data about the action and the Bluetooth mesh address of the Bluetooth mesh node (referred to herein as a first Bluetooth mesh node for clarity). This message can be sent in a Bluetooth broadcast to the various Bluetooth mesh nodes of the Bluetooth mesh network. For a Bluetooth mesh nodes that is not in the Bluetooth range of the computing device, the message can be relayed to it via an intermediary Bluetooth node (depending on the TTL value in the header of the message received by the intermediary Bluetooth node).

In an example, the flow also includes operation 1406, where the computing device determines based on data about the Bluetooth mesh network topology, that a second Bluetooth mesh node that is a single hop away is to be set as a proxy node to receive the response of the first Bluetooth mesh node. The first Bluetooth mesh node and the second Bluetooth mesh node can, but need not be the same. In an illustration, the computing devices uses the Bluetooth mesh address (or some other identifier) of the first Bluetooth mesh node in a look up of the proxy data to identify the proxy node via which the first Bluetooth mesh node can be reached.

In an example, the flow also includes operation 1408, where the computing device determines whether the second Bluetooth mesh node is already connected as a proxy node. For instance, the computing device checks whether the peer-to-peer connection (e.g., a GATT connection) is already established with the second Bluetooth mesh node. If this peer-to-peer connection is already established, operation 1412 follows operation 1408. Otherwise, operation 1410 follows operation 1410.

In an example, the flow also includes operation 1410, where the computing device establishes the peer-to-peer connection with the second Bluetooth mesh node. For instance, a GATT connection is established.

In an example, the flow also includes operation 1412, where the computing device receives the response of the first Bluetooth mesh node over the peer-to-peer connection. If the first Bluetooth mesh node and the second Bluetooth mesh node are the same, the response is sent directly by the first Bluetooth mesh node. If they are different, the response can be relayed forward by an intermediary mesh node, if any, and by the second Bluetooth mesh node to the computing device. Upon receiving the response, the computing device may terminate the peer-to-peer connection.

Figure 15:
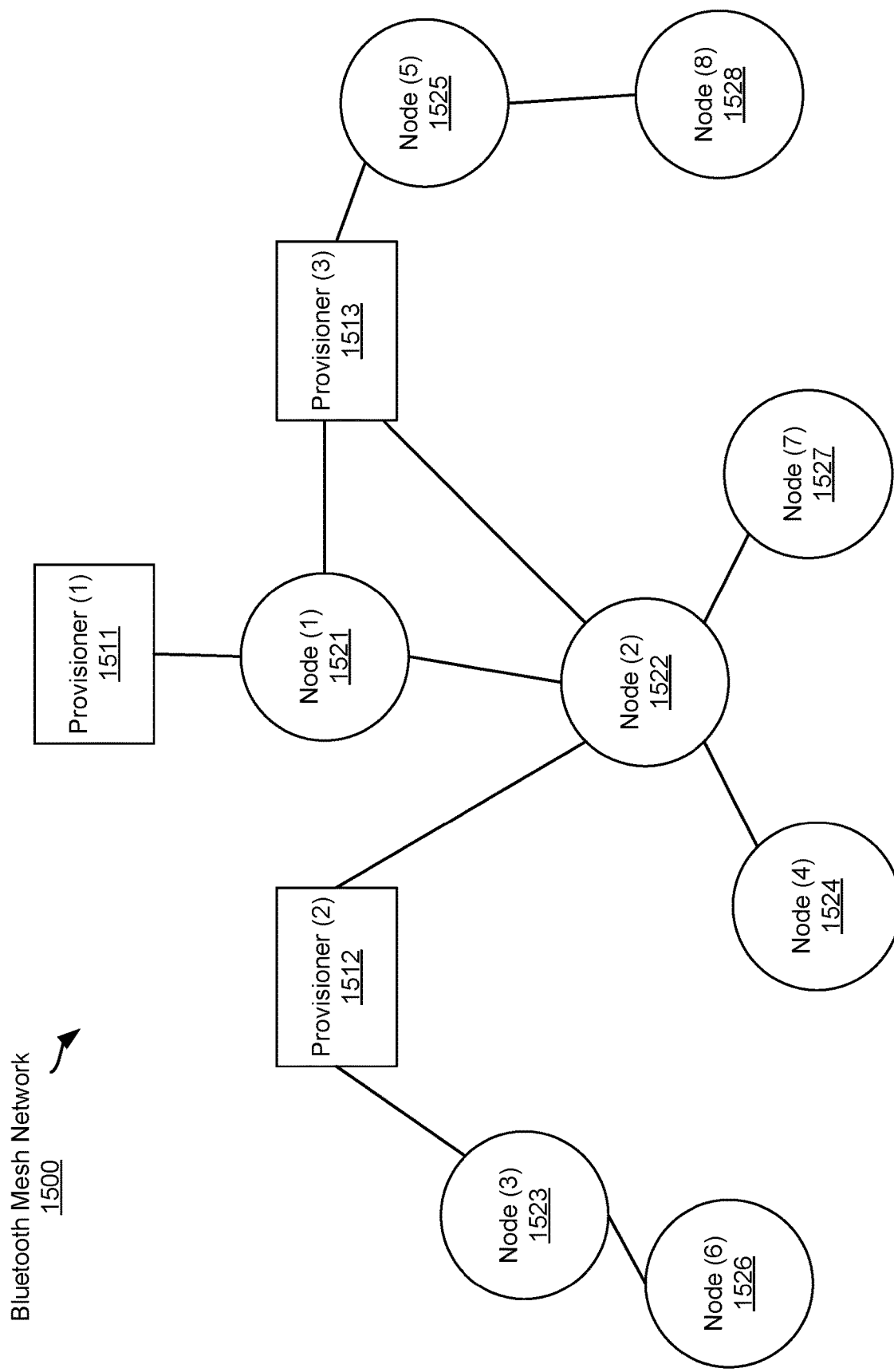
FIG. 15 illustrates an example of a Bluetooth mesh network that includes a plurality of provisioners, each of which is connected to one or more nodes, according to embodiments of the present disclosure.

FIG. 15 illustrates an example of a Bluetooth mesh network 1500 that includes a plurality of provisioners, each of which is connected to one or more Bluetooth mesh nodes, according to embodiments of the present disclosure. The Bluetooth mesh network 1500 is an example of the Bluetooth mesh network 200 of FIG. 2.

In the illustrative example of FIG. 15, the Bluetooth mesh network 1500 includes three provisioners: provisioner 1511, provisioner 1512, and provisioner 1513. Each of the provisioners 1511-1513 has an identifier shown in between parentheses (e.g., the provisioner 1511 has an identifier of "1," the provisioner 1512 has an identifier of "2," and the provisioner 1513 has an identifier of "3"). The identifiers can be set by a computer system in communications with the provisioners 1511-1513, such as the computer system 280 of FIG. 2, or can correspond to some other identifiers such as the media access control (MAC) addresses and/or a Bluetooth mesh addresses of the provisioners 1511-1513.

The Bluetooth mesh network 1500 includes a plurality of Bluetooth mesh nodes, shown as eight Bluetooth mesh nodes 1521-1528. Each of the Bluetooth mesh nodes 1521-1528 has an identifier shown in between parentheses (e.g., the Bluetooth mesh node 1521 has an identifier of "1," the Bluetooth mesh node 1522 has an identifier of "2," the Bluetooth mesh node 1523 has an identifier of "3," the Bluetooth mesh node 1524 has an identifier of "4," the Bluetooth mesh node 1525 has an identifier of "5," the Bluetooth mesh node 1526 has an identifier of "6," the Bluetooth mesh node 1527 has an identifier of "7," the Bluetooth mesh node 1528 has an identifier of "8"). The identifiers can be set by the provisioners 1511-1513, such as by being Bluetooth mesh addresses, or can correspond to some other identifier such as MAC addresses of the Bluetooth mesh nodes.

Some of the Bluetooth mesh nodes can be connected to multiple ones of the provisioners 1511-1513 and, hence, can be reached by the computer system via any of such provisioners. Other ones of the Bluetooth mesh nodes are connected to only one of the provisioners 1511-1513 and, hence, can be reached by the computer system via only such a provisioner. In other words, multiple network paths exist between the provisioners 1511-1513 and the Bluetooth mesh nodes 1521-1528, where each of such network path can correspond to a direct connection between one of the provisioners 1511-1513 and one of the Bluetooth mesh nodes 1521-1528 or an indirect connection between one of the provisioners 1511-1513 and one of the Bluetooth mesh nodes 1521-1528.

As illustrated, the Bluetooth mesh node 1521 is single hop away from each of the provisioner 1511 and the provisioner 1513 and is multiple hops away from the provisioner 1512 (it can be reached by the provisioner 1512 via the Bluetooth mesh node 1522). Similarly, the Bluetooth mesh node 1522 is a single hop away from each of the provisioner 1512 and the provisioner 1513 and is multiple hops away from the provisioner 1511. The Bluetooth mesh node 1523 is a single hop away from the provisioner 1512 and multiple hops away from each of the provisioner 1511 and the provisioner 1513. Similarly, the Bluetooth mesh node 1525 is a single hop away from the provisioner 1513 and multiple hops away from each of the provisioner 1511 and the provisioner 1512. Each of the Bluetooth mesh nodes 1524, 1526, 157, and 1528 is multiple hops away from each of the provisioner 1511, the provisioner 1512, and the provisioner 1513.

As further discussed in the next figures, a node assignment procedure can be used such that a Bluetooth mesh node becomes reachable by the computer system via only one of the provisioners 1511-1513 by assigning this Bluetooth mesh node exclusively to such a provisioner. In other words, rather than being reachable in single hops by the provisioner 1511 and the provisioner 1513 (e.g., via a first network path that is a direct connection between the provisioner 1511 and the Bluetooth mesh node and via second network path that is a direct connection between the provisioner 1513 and the Bluetooth mesh node), the topology of the Bluetooth mesh network can be updated such that the Bluetooth mesh node becomes reachable in a single hop by only one of the provisioner 1511 or the provisioner 1513 (e.g., an exclusive use of the first network path, or alternatively, an exclusive use of the second network path). A similar update is also made to the Bluetooth mesh node 1522 by assigning it exclusively to one of the provisioner 1512 or the provisioner 1513. While reducing the total number of single hop Bluetooth nodes (e.g., used as proxy nodes), the node assignment procedure ensures that all of the Bluetooth mesh nodes 1521-1528 remain reachable by the computer system.

Of course, the Bluetooth mesh network 1500 can have a different topology. The Bluetooth mesh network 1500 can also include a different number of provisioners and/or Bluetooth mesh nodes connected to the provisioners.

Figure 16:
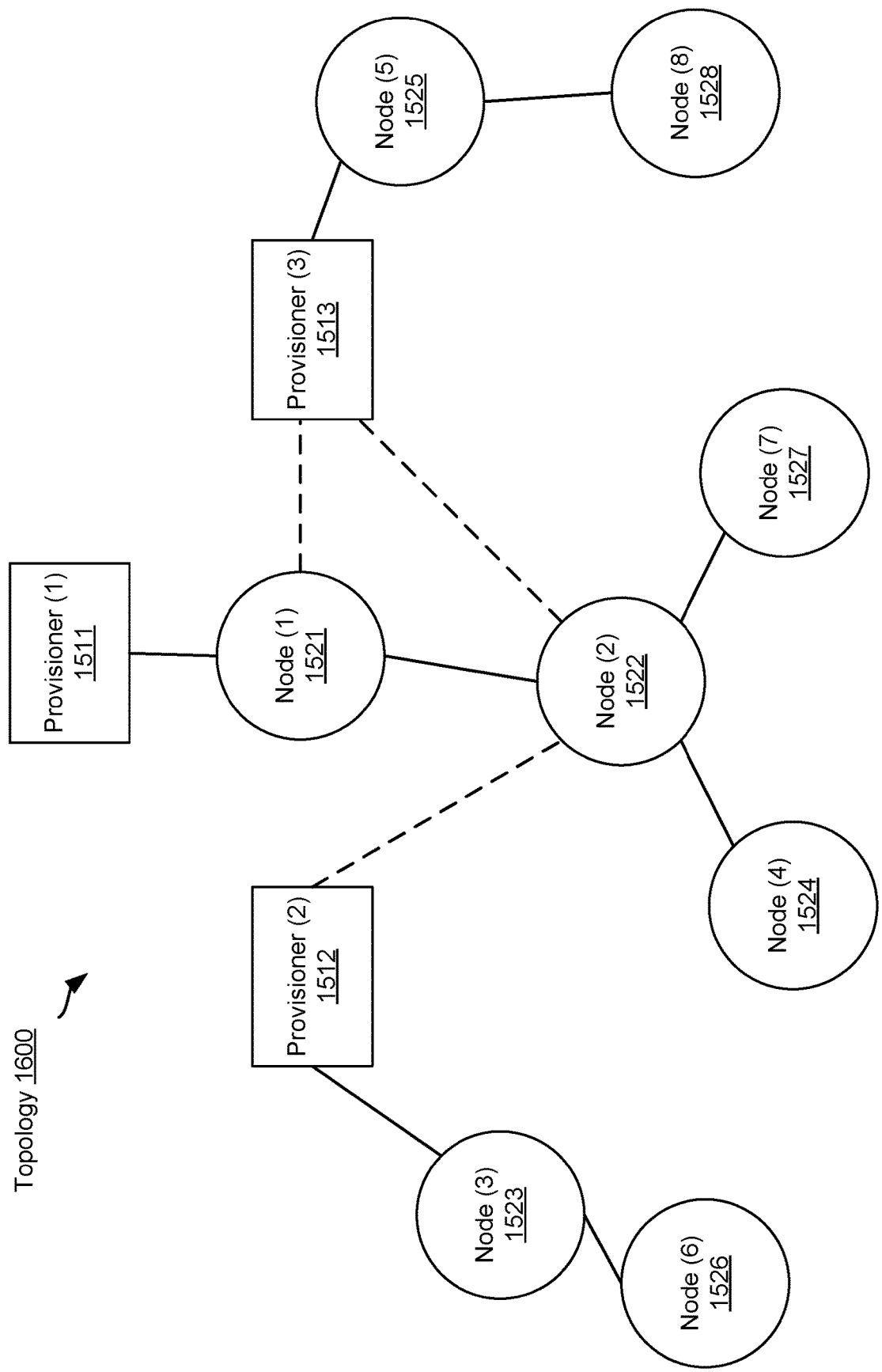
FIG. 16 illustrates an example of a topology of the Bluetooth mesh network of FIG. 15 upon completion of node assignments to the provisioners, according to embodiments of the present disclosure.

FIG. 16 illustrates an example of a topology 1600 of the Bluetooth mesh network 1500 of FIG. 15 upon completion of node assignments to the provisioners 1511-1513, according to embodiments of the present disclosure. In particular, the topology 1600 is the result of applying the node assignment procedure to assign each single hop Bluetooth mesh node exclusively to one of the provisioners 1511-1513 and assign each multiple hops Bluetooth mesh node, exclusively or not, to one of the provisioners 1511-1513 based on the exclusive assignment of the single hop Bluetooth mesh node(s) connected thereto.

In the illustration of FIG. 16, the Bluetooth mesh node 1521 is exclusively assigned to the provisioner 1511 (as shown with the solid line). The network path to the provisioner 1513 (e.g., the single hop that could have been used to establish a peer-to-peer connection between the provisioner 1513 and the Bluetooth mesh node 1521) is removed (as shown with a dashed line). Removing the path can be accomplished as a set of instructions from the computer system to the provisioner 1513 about avoiding to use the Bluetooth mesh node 1521 as a proxy node. These instructions can include node assignment data identifying to the provisioner 1513 that only the Bluetooth mesh nodes 1522 and 1525 can be used as proxy nodes.

As further shown in the illustration of FIG. 16, because the Bluetooth mesh node 1522 is reachable via the Bluetooth mesh node 1521 that was assigned as proxy node to the provisioner 1511, this Bluetooth mesh node 1522 is exclusively assigned to the provisioner 1511 (as shown with the solid line). The network paths to the provisioners 1512 and 1513 (e.g., the single hop that could have been used to establish a peer-to-peer connection between the provisioner 1512 and the Bluetooth mesh node 1522 and between the provisioner 1513 and the Bluetooth mesh node 1522) are removed (as shown with dashed lines).

Further, all of the Bluetooth mesh nodes 1521-1528 remain reachable by the computer system. For instance, the Bluetooth mesh node 1521 cab be reachable via the provisioner 1511. The Bluetooth mesh node 1522 can be reached multiple hops via the provisioner 1511 and the Bluetooth mesh node 1521. The Bluetooth mesh node 1523 and the Bluetooth mesh node 1526 can be reachable via the provisioner 1512 in a single hop or in two hops, respectively. Similarly, the Bluetooth mesh node 1525 and the Bluetooth mesh node 1528 can be reachable via the provisioner 1513 in a single hop or in two hops, respectively. The Bluetooth mesh nodes 1524 and the Bluetooth mesh node 1527 can be reachable via the Bluetooth mesh node 1522 that, in turn, is reachable indirectly via the provisioner 1511.

Figure 17:
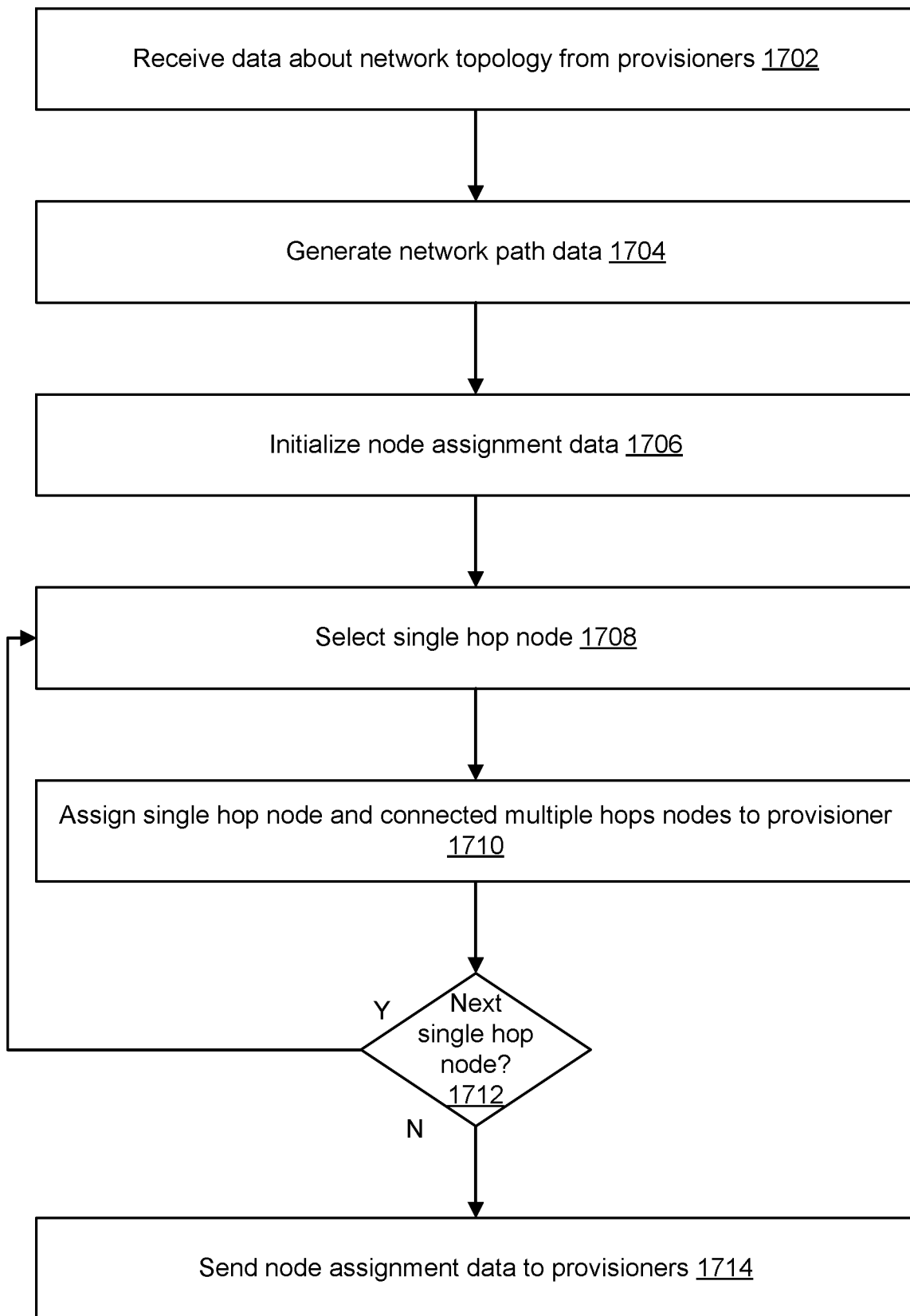
FIG. 17 illustrates an example of a flow for assigning nodes to provisioners in a Bluetooth mesh network, according to embodiments of the present disclosure.

FIG. 17 illustrates an example of a flow for assigning nodes to provisioners in a Bluetooth mesh network, according to embodiments of the present disclosure. Some or all of instructions for performing the operations of the flow can be implemented as hardware circuitry and/or stored as computer-readable instructions on a non-transitory computer-readable medium of a computer system, such as the computer system 280 of FIG. 2. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

In an example, the flow starts at operation 1702, where the computer system receives data about the network topology of the Bluetooth mesh network from the provisioners of the Bluetooth mesh network. For instance, the data can be received over one or more data networks and can include the reachability data and/or the proxy data as generated by each provisioner following a network monitoring procedure and/or a proxy node selection procedure.

In an example, the flow also includes operation 1704, where the computer system generates network path data based on the received data. For instance, the computer system re-arranges the received data to identify, for each Bluetooth mesh node, whether it is a single hop from each provisioner, whether it can be reached in multiple hops from each provisioner. Accordingly, the network path data includes an identifier of each Bluetooth mesh node, an indication of whether such Bluetooth mesh node can be a single hop and, if so, the provisioner(s) that this Bluetooth mesh node is a single hop from.

In an example, the flow also includes operation 1706, where the computer system initializes node assignment data. For instance, the assignment data includes an identifier of each provisioner and a set of Bluetooth mesh nodes that are assigned to this provisioner. This set is initialized as an empty set.

In an example, the flow also includes operation 1708, where the computer system selects a single hop Bluetooth mesh node. For instance, the computer system accesses the network path data to determine each Bluetooth mesh node that is a single hop from at least one provisioner. Next, the computer system performs the selection according to an ascending order of the Bluetooth mesh addresses of such single hop Bluetooth mesh nodes.

In an example, the flow also includes operation 1710, where the computer system assigns the selected single hop Bluetooth mesh node and the multiple hops away Bluetooth mesh node(s) that is (are) connected with the single hop Bluetooth mesh node to a provisioner. This assignment corresponds to selecting an exclusive use of the network path between the provisioner and the single hop Bluetooth mesh node and an exclusive use of a network path between the single hop Bluetooth mesh node and each of the multiple hops away Bluetooth mesh node(s). For instance, based on the network path data, the computer system can determine the Bluetooth mesh node(s), if any, connected with the single hop Bluetooth mesh node. Based on the network path data, the computer system can further determine one of two things: the single hop Bluetooth mesh node is already reachable via only one provisioner, or it is reachable via multiple provisioners. In the former determination, the computer system assigns the single hop Bluetooth mesh node and the multiple hop Bluetooth mesh node(s) (if any) to the provisioner. In the latter determination, the computer system selects one of the multiple provisioners for the assignment. The selection can be random. Or, the selection can account for how many single hop Bluetooth mesh nodes have been assigned to the multiple provisioners and the computer system selects the one having the smallest number of assignments. Assigning a Bluetooth mesh node to a provisioner involves including, in the node assignment data, the identifier of the Bluetooth mesh node (e.g., its Bluetooth mesh address) in the set of Bluetooth mesh nodes that are assigned to this provisioner. Once a Bluetooth mesh node is assigned, the computer system removes the Bluetooth mesh node from the network path data (e.g., removes its identifier).

In an example, the flow also includes operation 1712, where the computer system determines whether a next single hop Bluetooth mesh node can be selected. If all the single Bluetooth mesh nodes have already been assigned (e.g., all are removed by now from the network path data), no further selection is possible and operation 1714 follows operation 1712. Otherwise, operation 1708 follows operation 1712, where the computer system selects a next single hop Bluetooth mesh network that has not been removed from the network path data yet and performs another iteration of the node assignment procedure.

In an example, the flow also includes operation 1714, where the computer system sends, to the provisioners, the node assignment data indicating the exclusive assignments of at least the single hop nodes to the provisioners. For instance, upon performing the various iterations of the node assignment procedure (as indicated in the loop between operation 1712 and 1708), the computer system has updated the node assignment data such that, for each provisioner, a set of assigned Bluetooth mesh is identified. The entire node assignment data can be sent to each provisioner over the one or more data networks. Alternatively, for each provisioner, only the set of Bluetooth mesh nodes assigned to it is sent to this provisioner.

To illustrate the flow of FIG. 17, consider the example of the Bluetooth mesh network 1500 of FIG. 15 and the resulting topology 1600 of FIG. 16. Here, the received topology data at operation 1702 can be stored in a data structure, such as Table 6 below.

TABLE 6

| Identifier of provisioner | Identifier of single hop Bluetooth mesh node connected to provisioner | Identifier(s) of multiple hop Bluetooth mesh node(s) connected to single hop Bluetooth mesh node |
|---|---|---|
| 1 | 1 | 2 |
| | | 4 |
| | | 7 |

TABLE 6-continued

| Identifier of provisioner | Identifier of single hop Bluetooth mesh node connected to provisioner | Identifier(s) of multiple hop Bluetooth mesh node(s) connected to single hop Bluetooth mesh node |
|---|---|---|
| 2 | 2 | 1 |
|   |   | 4 |
|   |   | 7 |
|   | 3 | 6 |
| 3 | 2 | 1 |
|   |   | 4 |
|   |   | 7 |
|   | 5 | 8 |

Next, the computer system can generate the network path data at operation 1704 by re-arranging the stored topology data. The network path data can be stored in a data structure, such as Table 7 below.

TABLE 7

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh |
|---|---|---|
| 1 | 2, 4, 7 | 1, 3 |
| 2 | 1, 4, 7 | 2, 3 |
| 3 | 6 | 2 |
| 5 | 8 | 3 |

At operation 1706, the computer system can initialize the node assignment data as a data structure. An example of this data structure is shown in Table 8 below.

TABLE 8

| Identifier of provisioner | Assigned Bluetooth mesh node list |
|---|---|
| 1 | Empty |
| 2 | Empty |
| 3 | Empty |

In a first iteration of the node assignment procedure, starting at operation 1708, the computer system selects a single hop Bluetooth mesh node from Table 7 (e.g., from the center column), such as the Bluetooth mesh node 1521 having the Bluetooth mesh address of "1." At operation 1710, the computer system determines that the Bluetooth mesh nodes 1522, 1524, and 1527 are connected with the Bluetooth mesh node 1521 and that the Bluetooth mesh node 1521 is a single hop away from each of the provisioner 1511 and the provisioner 1513. The computer system selects to assign the single hop Bluetooth mesh node 1521 and the multiple hops Bluetooth mesh nodes 1522, 1524, and 1527 connected therewith to the provisioner 1521. This selection is shown in Table 9 below, where underlining indicates the assignment to the provisioner and the strikethrough indicates the no assignment.

TABLE 9

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh |
|---|---|---|
| 1 | 2, 4, 7 | 1, 3̶ |
| 2 | 1, 4, 7 | 2̶, 3 |
| 3 | 6 | 2 |
| 5 | 8 | 3 |

Given this assignment selection, the node assignment data is updated, as shown in Table 10 below.

TABLE 10

| Identifier of provisioner | Assigned Bluetooth mesh node list |
|---|---|
| 1 | 1, 2, 4, 7 |
| 2 | Empty |
| 3 | Empty |

To complete this iteration, the Bluetooth mesh nodes that have been assigned are removed (e.g., their identifiers are deleted) from the updated network path data, as shown in Table 11 below (the removal is shown with the strike-through).

TABLE 11

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh |
|---|---|---|
| 1̶ | 2̶,̶ 4̶,̶ 7̶ | 1, 3̶ |
| 2 | 1̶,̶ 4̶,̶ 7̶ | 2̶, 3 |
| 3 | 6 | 2 |
| 5 | 8 | 3 |

At this point, not all single hop Bluetooth mesh nodes have been assigned and a second iteration of the node assignment procedure is performed by looping back to operation 1708. In this iteration, the single hop Bluetooth mesh node 1522 (as identified in the second row of Table 11) has been already assigned and, hence, no additional assignment is needed for it. Instead, the computer system determines that the single hop Bluetooth mesh node 1523 needs to be assigned (as identified in the third row of Table 11). The computer system determines from the updated network path data, as shown in Table 11, that the multiple hops Bluetooth mesh node 1526 is connected with the single hop Bluetooth mesh node 1523 and that the single Bluetooth mesh node 1523 can be only assigned to the second provisioner 1512. Accordingly, the computer system assigns both Bluetooth mesh nodes 1523 and 1526 to this provisioner 1512, resulting in the updated network path data as shown in Table 12 and the updated node assignment data as shown in Table 13.

TABLE 12

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh |
|---|---|---|
| 1̶ | 2̶,̶ 4̶,̶ 7̶ | 1, 3̶ |
| 2̶ | 1̶,̶ 4̶,̶ 7̶ | 2̶, 3 |
| 3 | 6 | 2 |
| 5 | 8 | 2̶/3 |

TABLE 13

| Identifier of provisioner | Assigned Bluetooth mesh node list |
|---|---|
| 1 | 1, 2, 4, 7 |
| 2 | 3, 6 |
| 3 | Empty |

To complete the second iteration, the Bluetooth mesh nodes 1523 and 1526 that have been assigned are removed from the updated network path data, as shown in Table 14 below.

TABLE 14

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh |
|---|---|---|
| ~~1~~ | ~~2, 4, 7~~ | ~~1, 3~~ |
| ~~2~~ | ~~1, 4, 7~~ | ~~2, 3~~ |
| ~~3~~ | ~~6~~ | ~~2~~ |
| 5 | 8 | 3 |

Here also, not all single hop Bluetooth mesh nodes have been assigned and a third iteration of the node assignment procedure is performed by looping back to operation 1708. In this iteration, the computer system determines that the single hop Bluetooth mesh node 1525 needs to be assigned (as identified in the last row of Table 14). The computer system determines from the updated network path data, as shown in Table 14, that the multiple hops Bluetooth mesh node 1528 is connected with the single hop Bluetooth mesh 1525 and that the single Bluetooth mesh node 1525 can be only assigned to the second provisioner 1513. Accordingly, the computer system assigns both Bluetooth mesh nodes 1525 and 1528 to this provisioner 1513, resulting in the updated network path data as shown in Table 15 and the updated node assignment data as shown in Table 16.

TABLE 15

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh |
|---|---|---|
| ~~1~~ | ~~2, 4, 7~~ | ~~1, 3~~ |
| ~~2~~ | ~~1, 4, 7~~ | ~~2, 3~~ |
| ~~3~~ | ~~6~~ | ~~2~~ |
| ~~5~~ | ~~8~~ | ~~3~~ |

TABLE 16

| Identifier of provisioner | Assigned Bluetooth mesh node list |
|---|---|
| 1 | 1, 2, 4, 7 |
| 2 | 3, 6 |
| 3 | 5, 8 |

To complete the third iteration, the Bluetooth mesh nodes 1525 and 1528 that have been assigned are removed from the updated network path data, as shown in Table 17 below.

TABLE 17

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh |
|---|---|---|
| ~~1~~ | ~~2, 4, 7~~ | ~~1, 3~~ |
| ~~2~~ | ~~1, 4, 7~~ | ~~2, 3~~ |
| ~~3~~ | ~~6~~ | ~~2~~ |
| ~~5~~ | ~~8~~ | ~~3~~ |

At this point, all single hop Bluetooth mesh nodes (and, similarly, all multiple hops Bluetooth mesh nodes) have been assigned to a provisioner. Accordingly, no additional iterations of the node assignment procedure are needed. Instead, the computer system can store the updated node assignment data, as shown in Table 17 for use in the Bluetooth mesh network 1500. The network topology of Table 17 is the topology 1600 of FIG. 16. The computer system can send the Table 17 to each of the provisioners 1511-1513. Alternatively, the computer system can determine that the first row of Table 17 corresponds to the provisioner 1511 and only sends this row to the provisioner 1511. The computer system can do the same for the remaining provisioners 1512-1513, each of which would receive the corresponding portion from the Table 17.

Figure 18:
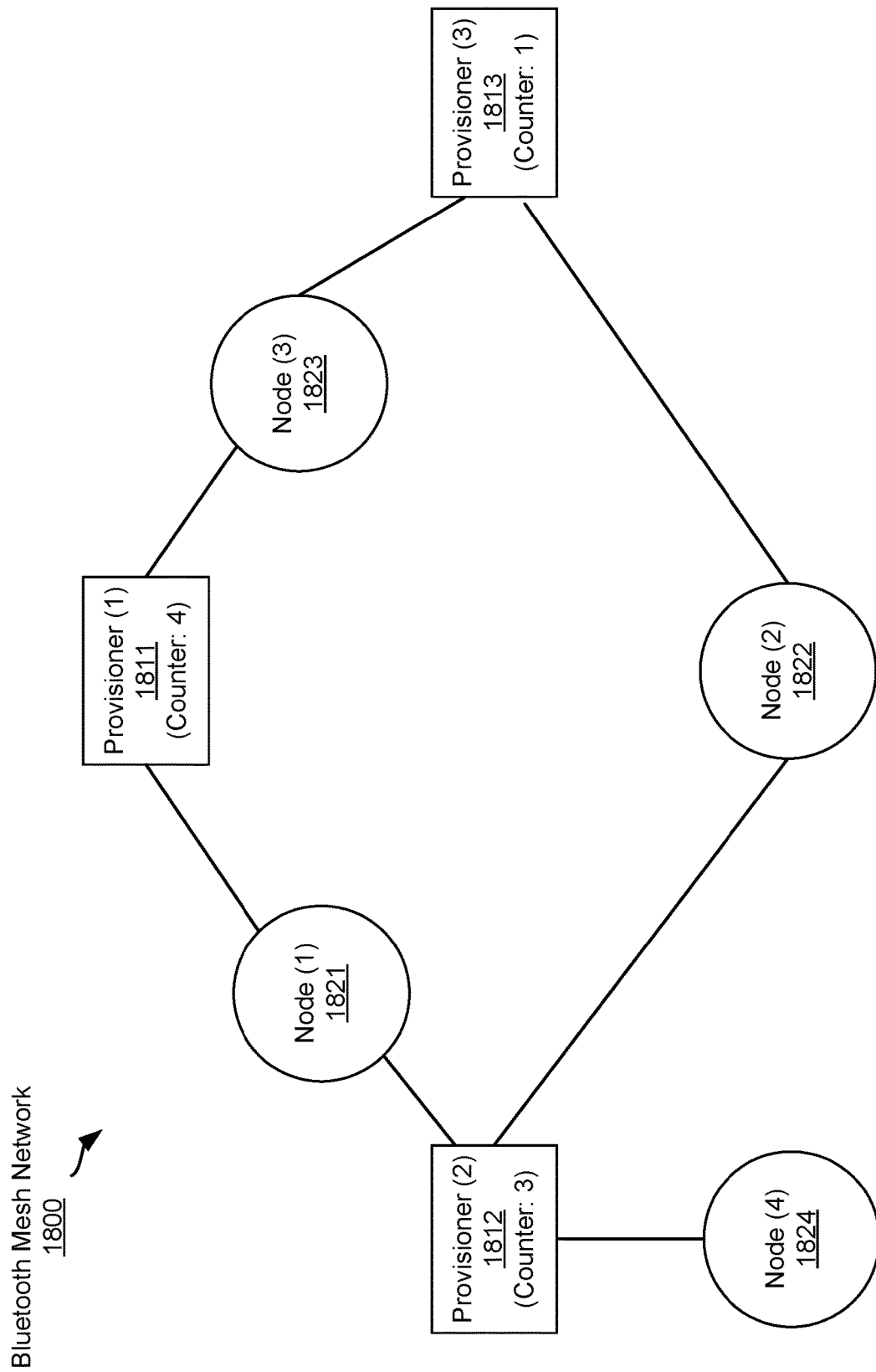
FIG. 18 illustrates another example of a Bluetooth mesh network that includes a plurality of provisioners, each of which is connected to one or more nodes, according to embodiments of the present disclosure.

FIG. 18 illustrates another example of a Bluetooth mesh network 1800 that includes a plurality of provisioners, each of which is connected to one or more nodes, according to embodiments of the present disclosure. The Bluetooth mesh network 1800 is an example of the Bluetooth mesh network 200 of FIG. 2. For illustrative purposes, the Bluetooth mesh network 1800 is shown as being different from the Bluetooth mesh network 1500 described in connection of FIGS. 15-17 although the description of FIGS. 15-21 applies equally to the two Bluetooth mesh network 1500 and 1800.

As explained herein above, when a single hop Bluetooth mesh node is connected with multiple provisioners, the computer system can randomly assign this single hop Bluetooth mesh node to one of the provisioners or based on the number of previous assignments of single hop Bluetooth mesh nodes to these provisioners. In comparison, and as described in connection with FIGS. 18-21, the assignment in such situations can depend on counters, each associated with one of the provisioners. A counter for a provisioner can be based on a maximum number of Bluetooth connections supported by the provisioner. This maximum number can be hardware limitation of the provisioner. For instance, if a provisioner can support up to four Bluetooth connections, its counter is set to four (or smaller value). The counter can be set by each provisioner and communicated to the computer system or can be set by the computer system based on receiving the maximum number from the provisioner.

In the illustrative example of FIG. 18, the Bluetooth mesh network 1800 includes three provisioners: provisioner 1811, provisioner 1812, and provisioner 1813. Each of the provisioners 1811-1813 has an identifier shown in between parentheses (e.g., the provisioner 1811 has an identifier of "1," the provisioner 1812 has an identifier of "2," and the provisioner 1813 has an identifier of "3"). Each of the provisioners 1811-1813 also has a counter further shown in between parentheses (e.g., the provisioner 1811 has a counter of "4," the provisioner 1812 has a counter of "3," and the provisioner 1813 has a counter of "1").

The Bluetooth mesh network 1800 includes a plurality of Bluetooth mesh nodes, shown as four Bluetooth mesh nodes 1821-1824. Each of the Bluetooth mesh nodes 1821-1824 has an identifier shown in between parentheses (e.g., the Bluetooth mesh node 1821 has an identifier of "1," the Bluetooth mesh node 1822 has an identifier of "2," the Bluetooth mesh node 1823 has an identifier of "3," and the Bluetooth mesh node 1824 has an identifier of "4").

Some of the Bluetooth mesh nodes can be connected to multiple ones of the provisioners 1811-1813 and, hence, can be reached by the computer system via any of such provisioners. Other ones of the Bluetooth mesh nodes are connected to only one of the provisioners 1811-1813 and, hence, can be reached by the computer system via only such a provisioner. In other words, multiple network paths exist between the provisioners 1811-1813 and the Bluetooth mesh nodes 1821-1824, where each of such network path can correspond to a direct connection between one of the provisioners 1811-1813 and one of the Bluetooth mesh nodes 1821-1824 or an indirect connection between one of the provisioners 1811-1813 and one of the Bluetooth mesh nodes 1821-1824.

As illustrated, the Bluetooth mesh node 1821 is single hop away from each of the provisioner 1811 and the provisioner 1812 and is multiple hops away from the provisioner 1813 (it can be reached by the provisioner 1813 via the provisioner 1811). Similarly, the Bluetooth mesh node 1822 is a single hop away from each of the provisioner 1812 and the provisioner 1813 and is multiple hops away from the provisioner 1811. The Bluetooth mesh node 1823 is a single hop away from each of the provisioner 1811 and the provisioner 1813 and is multiple hops away from the provisioner 1812. The Bluetooth mesh node 1824 is a single hop away from the provisioner 1812 and multiple hops away from each of the provisioner 1811 and the provisioner 1813.

Of course, the Bluetooth mesh network 1800 can have a different topology. The Bluetooth mesh network 1800 can also include a different number of provisioners and/or Bluetooth mesh nodes connected to the provisioners.

Figure 19:
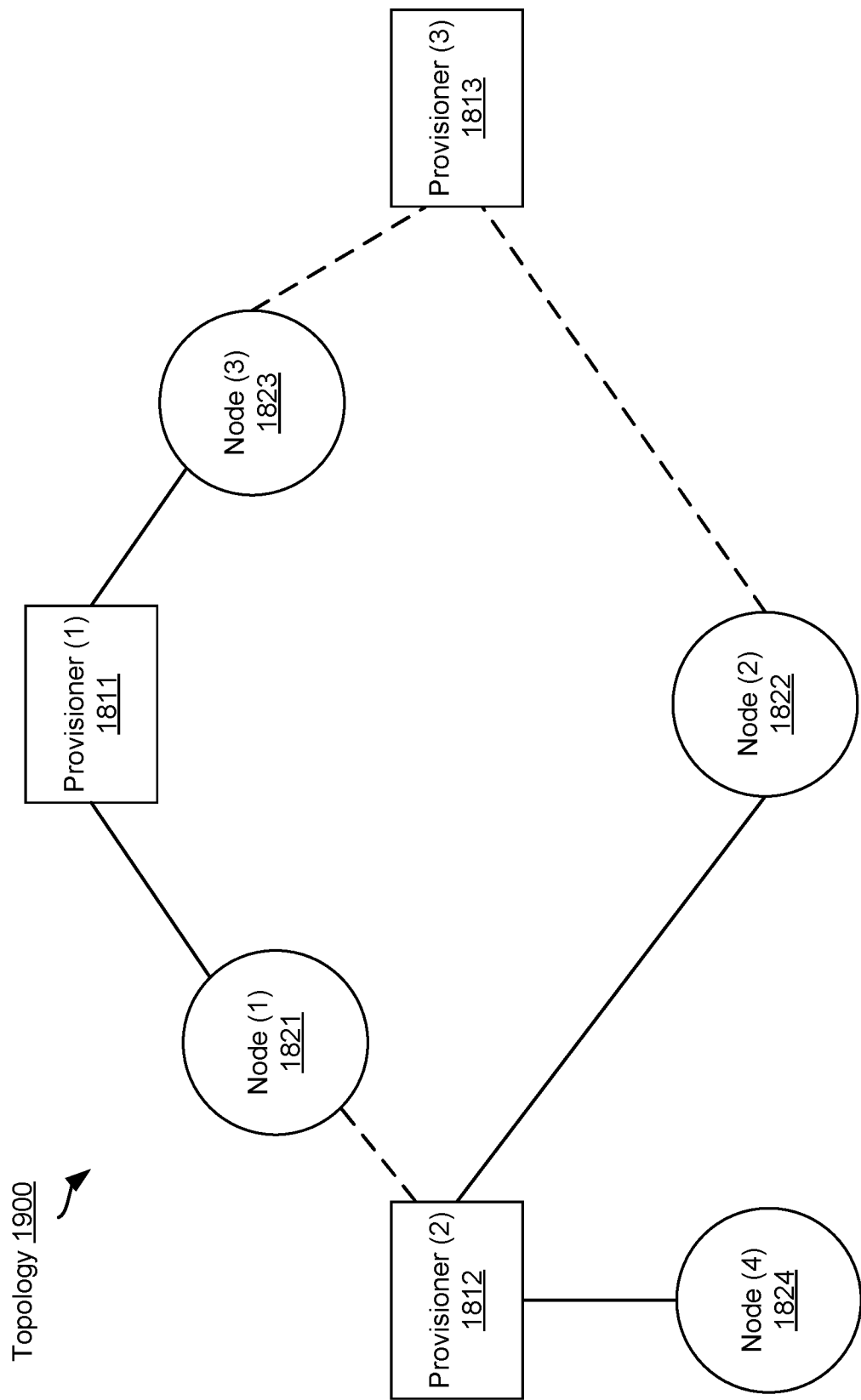
FIG. 19 illustrates an example of a topology of the Bluetooth mesh network of FIG. 18 upon completion of node assignments to the provisioners, according to embodiments of the present disclosure.

FIG. 19 illustrates an example of a topology 1900 of the Bluetooth mesh network 1800 of FIG. 18 upon completion of node assignments to the provisioners 1811-1813, according to embodiments of the present disclosure. In particular, the topology 1900 is the result of applying the node assignment procedure to assign each single hop Bluetooth mesh node exclusively to one of the provisioners 1811-1813 based on the counters and assign each multiple hops Bluetooth mesh node, exclusively or not, to one of the provisioners 1811-1813 based on the exclusive assignment of the single hop Bluetooth mesh node(s) connected thereto.

In the illustration of FIG. 19, the Bluetooth mesh node 1821 is exclusively assigned to the provisioner 1811 (as shown with the solid line). The network path to the provisioner 1812 (e.g., the single hop that could have been used to establish a peer-to-peer connection between the provisioner 1813 and the Bluetooth mesh node 1821) is removed (as shown with a dashed line).

Similarly in the illustration of FIG. 19, the Bluetooth mesh node 1822 is exclusively assigned to the provisioner 1812 (as shown with the solid line). The network path to the provisioner 1813 (e.g., the single hop that could have been used to establish a peer-to-peer connection between the provisioner 1812 and the Bluetooth mesh node 1822) is removed (as shown with a dashed line). Further, the Bluetooth mesh node 1823 is exclusively assigned to the provisioner 1811 (as shown with the solid line). The network path to the provisioner 1813 (e.g., the single hop that could have been used to establish a peer-to-peer connection between the provisioner 1813 and the Bluetooth mesh node 1823) is removed (as shown with a dashed line). In addition, the Bluetooth mesh node 1824 remains connected with via the assignment to the provisioner 1812. Accordingly, all Bluetooth mesh nodes 1821-1824 remain reachable by the computer system, although the provisioner 1813 has no Bluetooth mesh nodes assigned to it.

Figure 20:
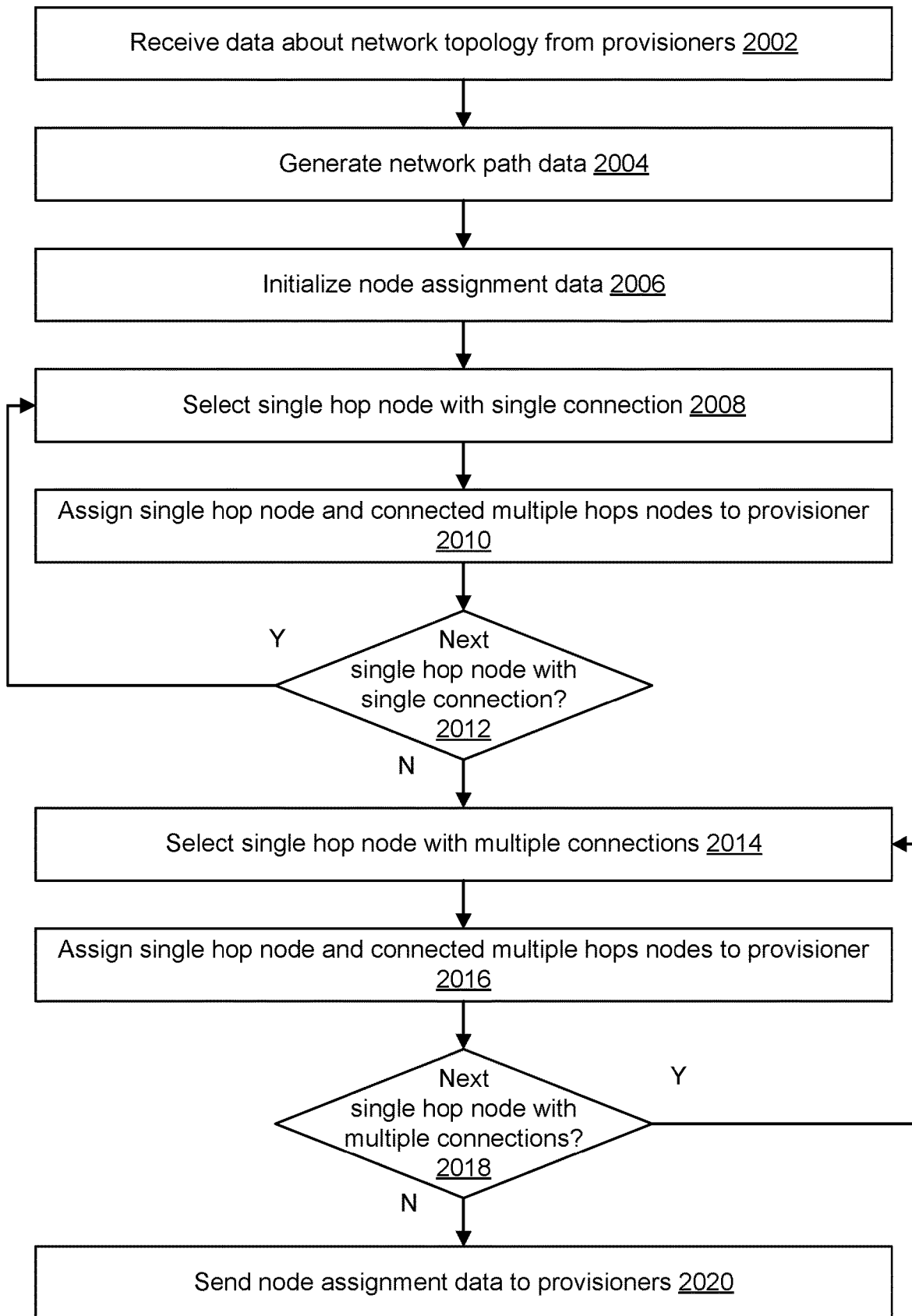
FIG. 20 illustrates an example of another flow for assigning nodes to provisioners in a Bluetooth mesh network, according to embodiments of the present disclosure.

FIG. 20 illustrates an example of another flow for assigning nodes to provisioners in a Bluetooth mesh network, according to embodiments of the present disclosure. Some or all of instructions for performing the operations of the flow can be implemented as hardware circuitry and/or stored as computer-readable instructions on a non-transitory computer-readable medium of the computer system. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

In an example, the flow starts at operation 2002, where the computer system receives data about the network topology of the Bluetooth mesh network from the provisioners of the Bluetooth mesh network. This operation 2002 can be similar to operation 1702.

In an example, the flow also includes operation 2004, where the computer system generates network path data based on the received data. This operation 2004 can be similar to operation 1704.

In an example, the flow also includes operation 2006, where the computer system initializes node assignment data. This operation 2006 can be similar to operation 1706.

In an example, the flow also includes operation 2008, where the computer system selects a single hop Bluetooth mesh node that is connected to only one provisioner, if any such Bluetooth mesh node exists in the Bluetooth mesh network. For instance, the computer system accesses the network path data to determine each Bluetooth mesh node that is a single hop from at least one provisioner. Next, the computer system determines if any of such single Bluetooth mesh nodes is connected to only one provisioner. If so, the computer system selects one of such single Bluetooth mesh nodes (e.g., based on an ascending order that uses the Bluetooth mesh addresses). Otherwise, operation 2014 can be performed instead of operation 2008.

In an example, the flow also includes operation 2010, where the computer system assigns the selected single hop Bluetooth mesh node and the multiple hops away Bluetooth mesh node(s) that is (are) connected with this single hop Bluetooth mesh node to the provisioner (the only one that the selected single hop Bluetooth mesh node is connected therewith). This assignment corresponds to selecting an exclusive use of the network path between the provisioner and the selected single hop Bluetooth mesh node and an exclusive use of a network path between the selected single hop Bluetooth mesh node and each of the multiple hops away Bluetooth mesh node(s). Assigning a Bluetooth mesh node to the provisioner involves including, in the node assignment data, the identifier of the Bluetooth mesh node (e.g., its Bluetooth mesh address) in the set of Bluetooth mesh nodes that are assigned to this provisioner. Once a Bluetooth mesh node is assigned, the computer system removes the Bluetooth mesh node from the network path data (e.g., removes its identifier). In addition, the counter of the provisioner is decreased by one.

In an example, the flow also includes operation 2012, where the computer system determines whether a next single hop Bluetooth mesh node can be selected, where this next single hop Bluetooth mesh node is connected with only one provisioner. If all the single Bluetooth mesh nodes identified at operation 2008 have already been assigned, no further selection is possible and operation 2014 follows operation 2012. Otherwise, operation 2008 follows operation 2012, where the computer system selects the next single hop Bluetooth mesh network and performs another iteration of the node assignment procedure.

In an example, the flow also includes operation 2014, where the computer system selects a single hop Bluetooth mesh node that is connected to multiple provisioners. For instance, the computer system accesses the network path data to determine each Bluetooth mesh node that is a single hop from at least one provisioner. Next, the computer system determines if any of such single Bluetooth mesh nodes is connected to multiple provisioners. If so, the computer system selects one of such single Bluetooth mesh nodes (e.g., based on an ascending order that uses the Bluetooth mesh addresses).

In an example, the flow also includes operation 2016, where the computer system assigns the selected single hop Bluetooth mesh node and the multiple hops away Bluetooth mesh node(s) that is (are) connected with this single hop Bluetooth mesh node to one of the provisioners. Here also, this assignment corresponds to selecting an exclusive use of the network path between the provisioner and the selected single hop Bluetooth mesh node and an exclusive use of a network path between the selected single hop Bluetooth mesh node and each of the multiple hops away Bluetooth mesh node(s). Here, the assignment can be based on the counters of the provisioners. For instance, based on the network path data, the computer system can determine the Bluetooth mesh node(s), if any, connected with the single hop Bluetooth mesh node. Based on the network path data, the computer system can further determine the multiple provisioners and their counters. The provisioner having the largest counter is selected and the single hop Bluetooth mesh node and the multiple hops Bluetooth mesh node(s) connected therewith are assigned to the selected provisioner. Assigning a Bluetooth mesh node to the provisioner involves including, in the node assignment data, the identifier of the Bluetooth mesh node (e.g., its Bluetooth mesh address) in the set of Bluetooth mesh nodes that are assigned to this provisioner. Once a Bluetooth mesh node is assigned, the computer system removes the Bluetooth mesh node from the network path data (e.g., removes its identifier). In addition, the counter of the provisioner is decreased by one.

In an example, the flow also includes operation 2018, where the computer system determines whether a next single hop Bluetooth mesh node can be selected. If all the single Bluetooth mesh nodes have already been assigned (e.g., all are removed by now from the network path data), no further selection is possible and operation 2020 follows operation 2018. Otherwise, operation 2014 follows operation 2088, where the computer system selects a next single hop Bluetooth mesh network that has not been removed from the network path data yet and performs another iteration of the node assignment procedure.

In an example, the flow also includes operation 2020, where the computer system sends, to the provisioners, the node assignment data indicating the exclusive assignments of at least the single hop nodes to the provisioners. This operation 2020 can be similar to the operation 1714.

To illustrate the flow of FIG. 20, consider the example of the Bluetooth mesh network 1800 of FIG. 18 and the resulting topology 1900 of FIG. 19. Here, the received topology data at operation 2002 can be stored in a data structure, such as Table 18 below.

TABLE 18

| Identifier of provisioner (and counter) | Identifier of single hop Bluetooth mesh node connected to provisioner | Identifier(s) of multiple hop Bluetooth mesh node(s) connected to single hop Bluetooth mesh node |
|---|---|---|
| 1 (4) | 1 | None |
|  | 3 | None |
| 2 (3) | 1 | None |
|  | 2 | None |
|  | 4 | None |
| 3 (1) | 2 | None |
|  | 3 | None |

Next, the computer system can generate the network path data at operation 2004 by re-arranging the stored topology data. The network path data can be stored in a data structure, such as Table 19 below.

TABLE 19

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh (and counter) |
|---|---|---|
| 1 | None | 1 (4), 2 (3) |
| 2 | None | 2 (3), 3 (1) |
| 3 | None | 3 (1), 1 (4) |
| 4 | None | 2 (3) |

At operation 2006, the computer system can initialize the node assignment data as a data structure. An example of this data structure is shown in Table 20 below.

TABLE 20

| Identifier of provisioner | Assigned Bluetooth mesh node list |
|---|---|
| 1 | Empty |
| 2 | Empty |
| 3 | Empty |

In a first iteration of the node assignment procedure, starting at operation 2008, the computer system selects a single hop Bluetooth mesh node from Table 18 that is connected to only one provisioner (e.g., from the center column), such as the Bluetooth mesh node 1824 having the Bluetooth mesh address of "4". At operation 2010, the computer system determines that no Bluetooth mesh nodes are connected with the Bluetooth mesh node 1824 and that the Bluetooth mesh node 1824 is a single hop away from the provisioner 1812. The computer system assigns the single hop Bluetooth mesh node 1824 and to the provisioner 1821. This selection is shown in Table 21 below, where underlining indicates the assignment to the provisioner. The counter of the provisioner 1821 is also decreased (the original value is shown with a strikethrough and the decreased value is shown next to the strikethrough). The assigned Bluetooth mesh node(s) (in this case, only the single hop Bluetooth mesh node 182) is (are) removed from the network path data (the removal is shown with a strikethrough).

TABLE 21

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh (and counter) |
|---|---|---|
| 1 | None | 1 (4), 2 (~~3~~ 2) |
| 2 | None | 2 (~~3~~ 2), 3 (1) |
| 3 | None | 3 (1), 1 (4) |
| 4 | None | 2̲ (~~3~~ 2) |

Given this assignment selection, the node assignment data is updated, as shown in Table 22 below.

TABLE 22

| Identifier of provisioner | Assigned Bluetooth mesh node list |
|---|---|
| 1 | Empty |
| 2 | 4 |
| 3 | Empty |

At this point, no single hop Bluetooth mesh node connected to a single provisioner remains. Instead, single hop Bluetooth mesh nodes each connected to multiple provisioners exist. According, and per operation 2014, the computer system selects one of such single hop Bluetooth mesh nodes, such as the Bluetooth mesh node 1821 and performs a second node assignment iteration. In this iteration, the single hop Bluetooth mesh node 1821 (as identified in the first row of Table 21) has not already been already assigned. The computer system determines from the updated network path data, as shown in Table 21, that no multiple hops Bluetooth mesh node is connected with the single hop Bluetooth mesh node 1821 and that the single Bluetooth mesh node 1821 can be assigned to one of the second provisioner 1811 or the provisioner 1812. Because the counter of the provisioner 1811 is larger than that of the provisioner 1812 (e.g., four versus two), the computer system selects the provisioner 1811, assigns the single hop Bluetooth mesh node 1821 to the provisioner 1811, decreases the counter of the provisioner 1811, and removes the single hop Bluetooth mesh node 1821 from the updated network path data, resulting in the updated network path data as shown in Table 23 and the updated node assignment data as shown in Table 24.

TABLE 23

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh (and counter) |
|---|---|---|
| ~~1~~ | None | 1̲ (4̶ 3), 2 (~~3~~ 2) |
| 2 | None | 2 (~~3~~ 2), 3 (1) |
| 3 | None | 3 (1), 1 (4̶ 3) |
| 4 | None | 2̲ (~~3~~ 2) |

TABLE 24

| Identifier of provisioner | Assigned Bluetooth mesh node list |
|---|---|
| 1 | 1 |
| 2 | 4 |
| 3 | Empty |

At the end of this second iteration, not all single hop Bluetooth mesh nodes have been assigned and a third iteration of the node assignment procedure is performed by looping back to operation 2014. In this iteration, the computer system determines that the single hop Bluetooth mesh node 1822 needs to be assigned. The computer system determines from the updated network path data, as shown in Table 23, that no multiple hops Bluetooth mesh node is connected with the single hop Bluetooth mesh 1822 and that the single Bluetooth mesh node 1822 can be assigned to one of the provisioner 1812 or the provisioner 1813. Because the counter of the provisioner 1812 is larger than that of the provisioner 1813 (e.g., two versus one), the computer system selects the provisioner 1812, assigns the single hop Bluetooth mesh node 1822 to the provisioner 1812, decreases the counter of the provisioner 1812, and removes the single hop Bluetooth mesh node 1822 from the updated network path data, resulting in the updated network path data as shown in Table 25 and the updated node assignment data as shown in Table 26.

TABLE 25

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh (and counter) |
|---|---|---|
| ~~1~~ | None | 1̲ (4̶ 3), 2 (~~3 2~~ 1) |
| ~~2~~ | None | 2̲ (~~3 2~~ 1), 3 (1) |
| 3 | None | 3 (1), 1 (4̶ 3) |
| 4 | None | 2̲ (~~3 2~~ 1) |

TABLE 26

| Identifier of provisioner | Assigned Bluetooth mesh node list |
|---|---|
| 1 | 1 |
| 2 | 4, 2 |
| 3 | Empty |

Here also, not all single hop Bluetooth mesh nodes have been assigned and a fourth iteration of the node assignment procedure is performed by looping back to operation 2014. In this iteration, the computer system determines that the single hop Bluetooth mesh node 1823 needs to be assigned. The computer system determines from the updated network path data, as shown in Table 25, that no multiple hops Bluetooth mesh node is connected with the single hop Bluetooth mesh 1823 and that the single Bluetooth mesh node 1823 can be assigned to one of the provisioner 1811 or the provisioner 1813. Because the counter of the provisioner 1811 is larger than that of the provisioner 1813 (e.g., three versus one), the computer system selects the provisioner 1811, assigns the single hop Bluetooth mesh node 1823 to the provisioner 1811, decreases the counter of the provisioner 1811, and removes the single hop Bluetooth mesh node 1823 from the updated network path data, resulting in the updated network path data as shown in Table 27 and the updated node assignment data as shown in Table 28.

TABLE 27

| Identifier of single hop Bluetooth mesh node | Identifier(s) of multiple hop Bluetooth mesh node(s) connected to single hop Bluetooth mesh node | Identifier(s) of provisioner(s) connected to single hop Bluetooth mesh (and counter) |
|---|---|---|
| ~~1~~ | None | ~~1 (4 3 2)~~, 2 (~~3 2~~ 1) |
| ~~2~~ | None | ~~2 (3 2 1)~~, 3 (1) |
| ~~3~~ | None | 3 (1), ~~1 (4 3 2)~~ |
| 4 | None | 2 (~~3 2~~ 1) |

TABLE 28

| Identifier of provisioner | Assigned Bluetooth mesh node list |
|---|---|
| 1 | 1, 3 |
| 2 | 4, 2 |
| 3 | Empty |

At this point, all single hop Bluetooth mesh nodes have been assigned to a provisioner. Accordingly, no additional iterations of the node assignment procedure are needed. Instead, the computer system can store the updated node assignment data, as shown in Table 28 for use in the Bluetooth mesh network 1800. The network topology of Table 28 is the topology 1900 of FIG. 19. The computer system can send the Table 28 to each of the provisioners 1811-1813. Alternatively, the computer system can determine that the first row of Table 28 corresponds to the provisioner 1811 and only sends this row to the provisioner 1811. The computer system can do the same for the remaining provisioners 1812-1813, each of which would receive the corresponding portion from the Table 28.

Figure 21:
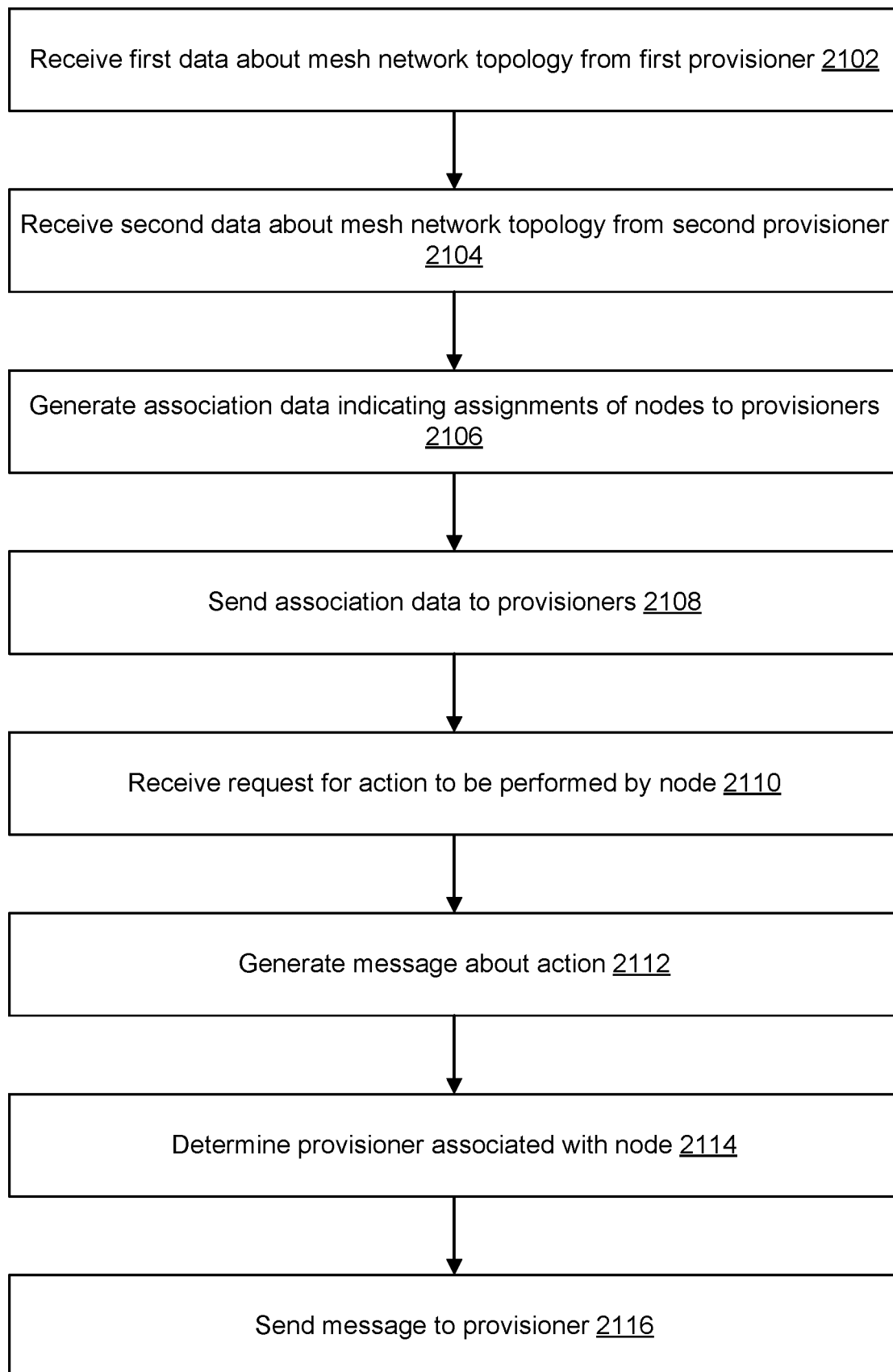
FIG. 21 illustrates an example of a flow for sending a message to a node in a Bluetooth mesh network that includes a plurality of provisioners and receiving a response from the node, according to embodiments of the present disclosure.

FIG. 21 illustrates an example of a flow for sending a message to a node in a Bluetooth mesh network that includes a plurality of provisioners and receiving a response from the node, according to embodiments of the present disclosure. Some or all of instructions for performing the operations of the flow can be implemented as hardware circuitry and/or stored as computer-readable instructions on a non-transitory computer-readable medium of the computer system. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

In an example, the flow starts at operation 2102, where the computer system receives first data about the topology of the Bluetooth mesh network from a first provisioner of the Bluetooth mesh network. For instance, the first data can include reachability data and/or proxy data generated by the first provisioner and can be received over one or more data networks.

In an example, the flow also includes operation 2104, where the computer system receives second data about the topology of the Bluetooth mesh network from a second provisioner of the Bluetooth mesh network. For instance, the second data can include reachability data and/or proxy data generated by the second provisioner and can be received over the one or more data networks. Of course, if more than two provisioners belong to the Bluetooth mesh network, additional data generated by each of such provisioners can be received. At operations 2102 and 2104, each of the provisioners can send its reachability and/or proxy data based on a trigger event, such as one of the trigger events described herein above.

In an example, the flow also includes operation 2106, where the computer system generates association data (e.g., association information) indicating assignment nodes to provisioners. For instance, the association data is node assignment data generated based on the first data, the second data, and/or any other reachability and/or proxy data received from other provisioners. The node assignment data can be generated by performing a node assignment procedure, as described in the flows of FIGS. 17 and 20.

In an example, the flow also includes operation 2108, where the computer system sends the association data to the first provisioner, the second provisioner, and any other provisioner. For instance, the entire node assignment data is sent to each of the provisioners. Alternatively, only the portion applicable to a provisioner is sent to that provisioner. In both illustrations, the node assignment data can be sent over the one or more data networks.

In an example, the flow also includes operation 2110, where the computer system receives a request for an action to be performed by a Bluetooth mesh node of the Bluetooth mesh network. For instance, the request can be received based on user input at a computing device connected with the computer system over one or more data networks, such as from the computing device 290 of FIG. 2.

In an example, the flow also includes operation 2112, where the computer system generates a message about the action. For instance, the message includes data about the action and an identifier, such as the Bluetooth mesh address, of the Bluetooth mesh node.

In an example, the flow also includes operation 2114, where the computer system determines the provisioner associated with the Bluetooth mesh node based on the node assignment data. For instance, the computer system uses the identifier in a look up of the node assignment data to identify the provisioner to which the Bluetooth mesh node has been assigned.

In an example, the flow also includes operation 2116, where the computer system sends the message to the provisioner. For instance, the message can be sent over the one or more data networks. Operations 2114 and 2116 may not be performed. Instead, the message can be sent to all of the provisioners of the Bluetooth mesh network. In response, each provisioner performs the look up to its stores node assignment data to determine if the Bluetooth mesh node is connected therewith. If so, the provisioner sends the message in, for instance, a broadcast. Otherwise, the provisioner ignores the message.

Figure 22:
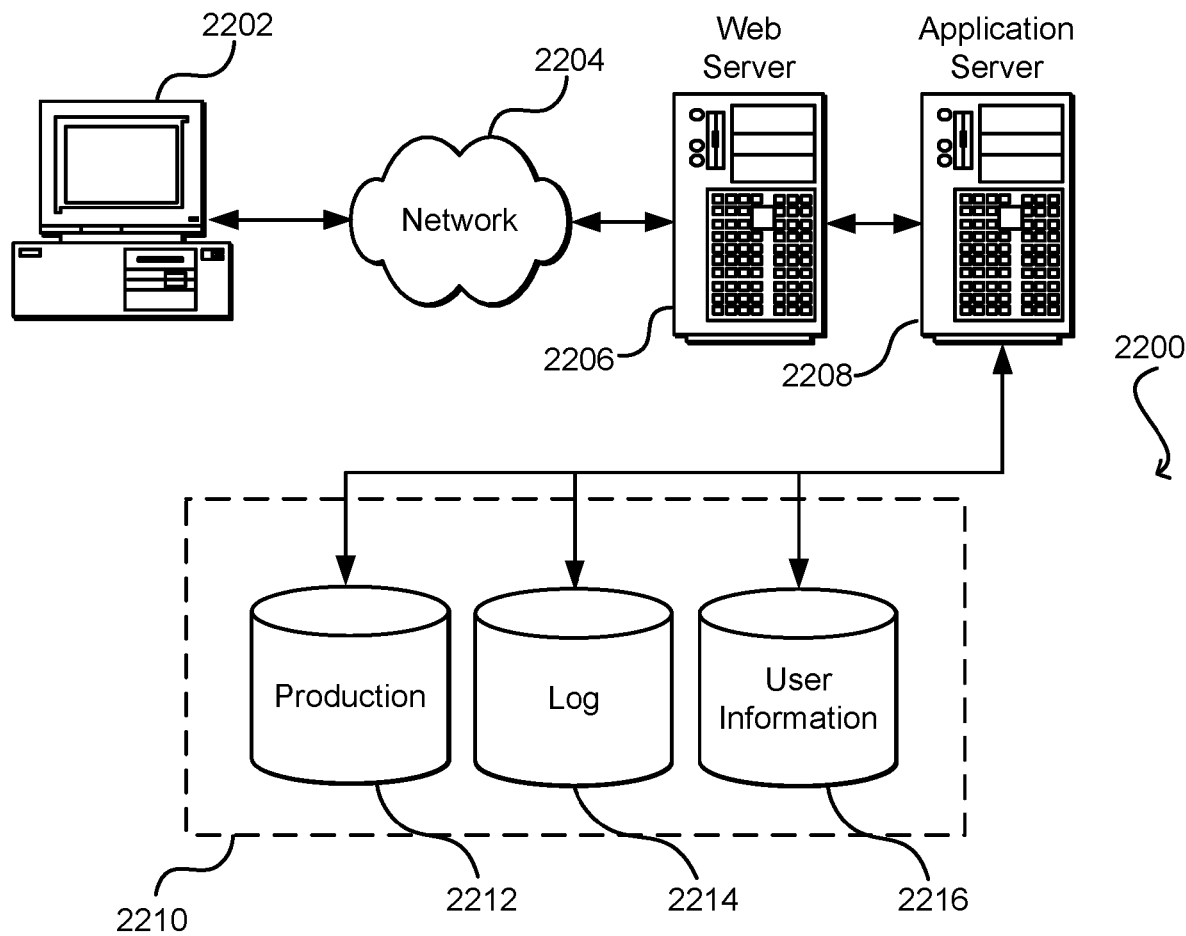
FIG. 22 illustrates aspects of an example environment for implementing aspects in accordance with various embodiments.

FIG. 22 illustrates aspects of an example environment 2200 for implementing aspects in accordance with various embodiments. As will be appreciated, although a Web-based environment is used for purposes of explanation, different environments may be used, as appropriate, to implement various embodiments. The environment includes an electronic client device 2202, which can include any appropriate device operable to send and receive requests, messages, or information over an appropriate network 2204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2206 for receiving requests and serving content in response thereto, although for other networks an alternative device serving a similar purpose could be used as would be apparent to one of ordinary skill in the art.

The illustrative environment includes at least one application server 2208 and a data store 2210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 2202 and the application server 2208, can be handled by the Web server. It should be understood that the Web and application servers are not required and are merely example components, as structured code discussed herein can be executed on any appropriate device or host machine as discussed elsewhere herein.

The data store 2210 can include several separate data tables, databases or other data storage mechanisms and media for storing data relating to a particular aspect. For example, the data store illustrated includes mechanisms for storing production data 2212 and user information 2216, which can be used to serve content for the production side. The data store also is shown to include a mechanism for storing log data 2214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2210. The data store 2210 is operable, through logic associated therewith, to receive instructions from the application server 2208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 2202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the system 2200 in FIG. 22 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

What is claimed is:

1. A Bluetooth mesh network, comprising:
   a first device;
   a second device;
   a third device;
   a fourth device; and
   a server computer storing computer-readable instructions that, upon execution by one or more processors of the server computer, cause the server computer to:
      receive, from the first device, first data about a topology of the Bluetooth mesh network, the first data comprising:
         a first identifier of the third device and a second identifier of the fourth device;
         a first value indicative of a first number of hops in the Bluetooth mesh network between the first device and the third device; and
         a second value indicative of a second number of hops in the Bluetooth mesh network between the first device and the fourth device;
      receive, from the second device, second data about the topology, the second data comprising the first identifier and the first number of hops;
      determine that the first number of hops indicates that the third device is a single hop away from each of the first device and the second device;
      determine that the third device is to be reached exclusively via the first device based at least in part on the third device being a single hop away from the first device;
      determine, from the first data, that the fourth device is connected with the first device via the third device and is multiple hops away from the first device;
      generate, based at least in part on a procedure that reduces a number of single hop connections, association information between the first device, the first identifier, and the second identifier, the association information indicating that the fourth device is to be reached via the third device and that the third device is to be reached via the first device instead of the second device;
      generate a message about an action directed to the fourth device; and
      send, based at least in part on the association information, the message to the first device instead of the second device.

2. The Bluetooth mesh network of claim 1, wherein the first device stores first computer-readable instructions that, upon execution by one or more processors of the first device, cause the first device to:
    establish a peer-to-peer direct network connection with the third device;
    receive, over the peer-to-peer direct network connection, a packet sent by the fourth device;
    determine, based at least in part on the packet, the second value of the second number of hops between the first device and the fourth device;
    generate an association between the third device, the fourth device, and the second value of the second number of hops; and
    include the association in the first data.

3. The Bluetooth mesh network of claim 2, wherein the first device stores second computer-readable instructions that, upon execution by the one or more processors of the first device, cause the first device to:
    associate a set of devices of the Bluetooth mesh network with a group address, the set comprising the fourth device; and
    send, over the peer-to-peer direct network connection, a query to the third device, the query comprising the group address and a first code, and
wherein the packet comprises a second code related to the first code.

4. A method implemented by a computer system, the method comprising:
    receiving, from a first device of a mesh network that includes a second device, a first identifier of a third device of the mesh network;
    receiving, from the second device of the mesh network, the first identifier;
    determining, based at least in part on the first identifier being received from each of the first device and the second device, a first network path between the first device and the third device and a second network path between the second device and the third device;
    determining that the third device is a single hop away from each of the first device and the second device;
    generating, based at least in part on a procedure that reduces a number of single hop connections, association information between the third device and the first device, the association information indicating an exclusive use of the first network path instead of the second network path in association with sending messages by the computer system to the third device;
    generating a message about an action directed to the third device; and
    sending, based at least in part on the association information, the message to the first device instead of the second device.

5. The method of claim 4, further comprising:
    receiving, from the first device, first data about a first number of hops between the first device and the third device;
    receiving, from the second device, second data about a second number of hops between the second device and the third device;
    determining, based at least in part on the first data, that the third device is a single hop away from the first device;
    determining, based at least in part of the second data, that the third device is a single hop away from the first device; and
    determining the exclusive use of the first network path based at least in part on a reduction of a total number of network paths usable in association with sending the message.

6. The method of claim 4, further comprising:
    receiving, from the first device, a second identifier of a fourth device of the mesh network, the fourth device and the first device connected via the third device;
    determining that the third device is a single hop away from the first device and the fourth device is multiple hops away from the first device;
    determining that the third device is to be reached via the first device and not the second device based at least in part on the third device being a single hop away from the first device;
    determining that the fourth device is to be reached via the first device based at least in part on the fourth device being multiple hops away from the first device and connected with the first device via the third device; and
    generating second association information between the first device, the third device, and the fourth device and indicating that the third device is to be reached exclusively via the first device and that the fourth device is to be reached via the third device.

7. The method of claim 4, further comprising:
    receiving, from the first device, first data indicating that (i) the third device is a single hop away from the first device and (ii) a fourth device of the mesh network is multiple hops away from the first device and is communicatively coupled with the first device via the third device;
    receiving, from the second device, second data indicating that (iii) the third device is a single hop away from the second device; and
    generating third data based at least in part on the first data and the second data, the second data indicating that (iv) the first device is a single hop away from either the first device or the second device and (v) the fourth device is multiple hops away from the first device.

8. The method of claim 7, further comprising:
    determining, based at least in part on the third data, that the third device is a single hop away from the first device and the second device;
    including the first identifier in fourth data that indicates the exclusive use of the first network path;
    determining, based at least in part on the third data, that the fourth device is multiple hops away from the first device and is communicatively coupled with the third device; and
    including a second identifier of the fourth device in the fourth data.

9. The method of claim 7, further comprising:
    accessing fourth data that indicates the exclusive use of the first network path;
    determining, based at least in part on the third data, that the fourth device is a single hop away from the second device and multiple hops away from the first device;
    determining that a second identifier of the fourth device is included in the fourth data; and
    determining that the fourth device is to be reached via the first device and not the second device based at least in part on the second identifier of being included in the fourth data.

10. The method of claim 7, further comprising:
    accessing fourth data that indicates the exclusive use of the first network path;

determining, based at least in part on the third data, that the fourth device is a single hop away from the second device;

determining that a second identifier of the fourth device is not included in the fourth data;

determining that the fourth device is to be reached exclusively via the second device; and including, in the fourth data, an indication that the fourth device is to be reached exclusively via the second device.

11. The method of claim 7, further comprising:

generating fourth data based at least in part on the third data, the fourth data indicating the exclusive use of the first network path; and determining that each of a plurality of device of the mesh network other than the first device and the second device has been assigned to at least one of the first device or the second device.

12. The method of claim 7, further comprising:

generating fourth data based at least in part on the third data, the fourth data indicating the exclusive use of the first network path and comprising identifiers of devices that are part of the first network path; and sending the identifiers to the first device.

13. A computer system comprising:

one or more processors; and one or more memories storing computer-readable instructions that, upon execution by one or more processors of the computer system, cause the computer system to:

receive, from a first device of a mesh network that includes a second device, a first identifier of a third device of the mesh network;

receive, from the second device of the mesh network, the first identifier of the third device;

determine, based at least in part on the first identifier being received from each of the first device and the second device, a first network path between the first device and the third device and a second network path between the second device and the third device;

determine that the third device is a single hop away from each of the first device and the second device;

generate, based at least in part on a procedure that reduces a number of single hop connections, association information between the third device and the first device, the association information indicating an exclusive use of the first network path instead of the second network path in association with sending messages by the computer system to the third device;

generate a message about an action directed to the third device; and send, based at least in part on the association information, the message to the first device instead of the second device.

14. The computer system of claim 13, wherein the one or more memories further store additional computer-readable instructions that, upon execution by the one or more processors of the computer system, cause the computer system to:

generate first data indicating (i) a first set of devices that are a single hop away from either the first device or the second device, (ii) a second set of devices each being multiple hops away from either the first device or the second device, and (iii) a counter value for each of the first device and the second device.

15. The computer system of claim 14, wherein the one or more memories additionally store further computer-readable instructions that, upon execution by the one or more processors of the computer system, cause the computer system to:

determine, based at least in part on the first data, that the third device is a single hop away from each of the first device and the second device;

determine that the counter value of the first device is larger than the counter value of the second device;

include the first identifier in second data based at least in part on the counter value of the first device being larger than the counter value of the second device, wherein the second data indicates the exclusive use of the first network path; and decrease the counter value of the first device.

16. The computer system of claim 14, wherein the one or more memories additionally store further computer-readable instructions that, upon execution by the one or more processors of the computer system, cause the computer system to:

determine, based at least in part on the first data, that the third device is a single hop away from each the first device;

include the first identifier in second data, wherein the second data indicates the exclusive use of the first network path;

decrease the counter value of the first device;

determine, based at least in part on the first data, that a fourth device is multiple hops away from the first device and is connected via the third device; and include a second identifier of the fourth device in the second data.

17. The computer system of claim 14, wherein the one or more memories additionally store further computer-readable instructions that, upon execution by the one or more processors of the computer system, cause the computer system to:

generate second data based at least in part on the first data, the second data indicating the exclusive use of the first network path and comprising identifiers each corresponding to a different device of the first network path;

determine that each device of the mesh network other than the first device and the second device has been assigned to either the first device or the second device; and send at least a portion of the second data to the first device.

18. The computer system of claim 14, wherein the counter value of the first device is based at least in part on a maximum number of Bluetooth connections supported by the first device.

19. The computer system of claim 13, wherein the procedure enables a reduction of the number of single hop connections within the mesh network and enables devices of the mesh network to remain reachable.

20. The computer system of claim 13, wherein the one or more memories further store additional computer-readable instructions that, upon execution by the one or more processors of the computer system, cause the computer system to:

determine that a first counter value associated with the first device is larger than a second counter value associated with the second device, the first counter value indicating a number of connections that the first device supports;

include the first identifier in second data based at least in part on the first counter value, wherein the second data indicates the exclusive use of the first network path; and decrease the first counter value of the first device.

\* \* \* \* \*